US011819823B2

(12) United States Patent
Cui et al.

(10) Patent No.: US 11,819,823 B2
(45) Date of Patent: Nov. 21, 2023

(54) SUPER-ADSORBING POROUS THERMO-RESPONSIVE DESICCANTS

(71) Applicants: Alliance for Sustainable Energy, LLC, Golden, CO (US); The Regents of the University of California, Oakland, CA (US)

(72) Inventors: Shuang Cui, Dallas, TX (US); Jason David Woods, Boulder, CO (US); Renkun Chen, San Diego, CA (US); Paul William Meyer, Lakewood, CO (US)

(73) Assignees: Alliance for Sustainable Energy, LLC, Golden, CO (US); The Regents of the University of California, Oakland, CA (US)

(*) Notice: Subject to any disclaimer, the term of this patent is extended or adjusted under 35 U.S.C. 154(b) by 232 days.

(21) Appl. No.: 17/466,054

(22) Filed: Sep. 3, 2021

(65) Prior Publication Data

US 2022/0062858 A1 Mar. 3, 2022

Related U.S. Application Data

(60) Provisional application No. 63/074,072, filed on Sep. 3, 2020.

(51) Int. Cl.
*B01J 20/26* (2006.01)
*B01J 20/28* (2006.01)
*B01J 20/22* (2006.01)
*C08J 3/24* (2006.01)

(52) U.S. Cl.
CPC .......... *B01J 20/264* (2013.01); *B01J 20/223* (2013.01); *B01J 20/267* (2013.01); *B01J 20/28035* (2013.01); *C08J 3/24* (2013.01); *B01J 2220/46* (2013.01); *B01J 2220/66* (2013.01); *B01J 2220/86* (2013.01); *C08J 2333/26* (2013.01); *C08J 2351/00* (2013.01)

(58) Field of Classification Search
CPC ........ B01J 20/26; B01J 20/264; B01J 20/223; B01J 20/267; B01J 20/28035; B01J 2220/46; B01J 2220/66; B01J 2220/86; C08J 3/24; C08J 2333/26; C08J 2351/00
USPC ........................................................ 502/402
See application file for complete search history.

(56) References Cited

U.S. PATENT DOCUMENTS

| 9,211,499 B2 | 12/2015 | Jangbarwala |
| 2012/0201730 A1 | 8/2012 | Pahwa et al. |
| 2013/0309927 A1 | 11/2013 | Jangbarwala |

FOREIGN PATENT DOCUMENTS

| WO | WO-2016068129 A1 * | 5/2016 | ............. B01D 53/26 |
| WO | 2018/148482 A1 | 8/2018 | |

OTHER PUBLICATIONS

"SDS 60—Serile, Disposable", available at http://www.hyrel3d.com/portfolio/sds-60/, accessed on Jan. 18, 2022, pp. 1-3.
"Topology Optimization for Manufacturing", available at https://ntopology.com/topology-optimization-software/, accessed on Jan. 18, 2022, pp. 1-11.
Al-Alili et al., "Performance of a desiccant wheel cycle utilizing new zeolite material: Experimental investigation", Energy, Mar. 2015, vol. 81, pp. 137-145.
Ashraf, et al. "Snapshot of phase transition in thermoresponsive hydrogel PNIPAM: Role in drug delivery and tissue engineering", Macromolecular Research, 2016, vol. 24, No. 4, pp. 297-304.
Burba et al., "Salt Effects on Poly(N-isopropylacrylamide) Phase Transition Thermodynamics from NMR Spectroscopy", The Journal of Physical Chemistry B, 2008, vol. 112, pp. 10399-10404.
Cabeza et al., "Materials used as PCM in thermal energy storage in buildings: a review", Renewable and Sustainable Energy Reviews, 2011, vol. 15, No. 3, pp. 1675-1695.
Casey et al., "Salt impregnated desiccant matrices for 'open' thermochemical energy storage—Selection, synthesis and characterisation of candidate materials", Energy and Buildings, 2014, vol. 84, pp. 412-425.
Charles et al., "Thermo-responsive Hydrogel Desiccant Material", A Thesis submitted in partial satisfaction of the requirements for the degree Master of Science in Engineering Sciences (Mechanical Engineering) University of California, San Diego, 2017, pp. 1-67.
Chen et al., "POSS Hybrid Robust Biomass IPN Hydrogels with Temperature Responsiveness", Polymers, 2019, vol. 11, No. 524, pp. 1-18.
Chen et al., "Anisotropic thermoresponsive hydrogels by mechanical force orientation of clay nanosheets", Polymer, 2020, vol. 192, pp. 1-8.
Cui et al., "Cooling performance of bio-mimic perspiration by temperature-sensitive hydrogel", International Journal of Thermal Sciences, 2014, vol. 79, pp. 276-282.
Cui et al., "Bio-inspired effective and regenerable building cooling using tough hydrogels", Applied Energy, 2016, vol. 168, pp. 332-339.
Cui, "Thermal Transport and Transformation in Micro-Structured Materials", A dissertation submitted in partial satisfaction of the requirements for the degree Doctor of Philosophy in Engineering Sciences (Mechanical Engineering), University of California, San Diego, 2018, pp. 1-149.

(Continued)

*Primary Examiner* — Edward M Johnson
(74) *Attorney, Agent, or Firm* — Alexandra M. Hall; Michael A. McIntyre

(57) ABSTRACT

Thermo-responsive hydrogel composite (TRHC) desiccants having high adsorption capacities, fast adsorption/desorption rates, and low regeneration temperatures ($T_{reg}$) compared to traditional desiccants. TRHC desiccants may be synthesized by freeze drying. The porous structures resulting from freeze drying copolymers of thermo-responsive polymers and/or hygroscopic agents may be combined with hygroscopic inorganic salts, resulting in TRHC desiccants having superior performance properties.

16 Claims, 26 Drawing Sheets

(56) References Cited

OTHER PUBLICATIONS

Dishisha et al., "Bio-based 3-hydroxypropionic-and acrylic acid production from biodiesel glycerol via integrated microbial and chemical catalysis", Microbial Cell Factories, 2015, vol. 14, vol. 200, pp. 1-11.

Daou et al., "Desiccant cooling air conditioning: a review", Renewable and Sustainable Energy Reviews, 2006, vol. 10, No. 2, pp. 55-77.

Gordeeva et al., "Composites 'salt inside porous matrix' for adsorption heat transformation: a current state-of-the-art and new trends", International Journal of Low-Carbon Technologies, 2012, vol. 7, pp. 288-302.

Gordeeva et al., Composites "binary salts in porous matrix" for adsorption heat transformation. Applied Thermal Engineering, 2013. 50(2): p. 1633-1638.

Gupta et al., "Design Rationale for Stimuli-Responsive, Semi-interpenetrating Polymer Network Hydrogels—A Quantitative Approach", Macromolecular Rapid Communications, 2020, vol. 41, No. 2000199, pp. 1-7.

Halperin et al., Poly(N-Isopropylacrylamide) Phase Diagrams: Fifty Years of Rsearch, Angewandte Chemie—International Edition, Dec. 2015, vol. 15, No. 51, pp. 15342-15367.

Henning, "Solar assisted air conditioning of buildings—an overview", Applied Thermal Engineering, 2007, vol. 27, No. 10, pp. 1734-1749.

Hirschey et al., "Review of Inorganic Salt Hydrates with Phase Change Temperature in Range of 5 to 60° C. and Material Cost Comparison with Common Waxes", International High Performance Buildings Conference, Jul. 2018, pp. 1-11.

Huh et al., "Enhanced Swelling Rate of Poly(Ethylene Glycol)-Grafted Superporous Hydrogels", Journal of Bioactive and Compatible Polymers, May 2005, vol. 20, No. 3, pp. 231-243.

Kahn et al., "Preparation and Characterization of Novel Temperature and pH Sensitive (NIPAM-co-MAA) Polymer Microgels and Their Volume Phase Change with Various Salts", Polymer, 2013, vol. 37, No. 6, pp. 794-801.

Kalmutzki et al., "Metal-organic frameworks for water harvesting from air", Advanced Materials, Apr. 2018, vol. 30, No. 37, pp. 1-26.

Kaneko et al., "Fast Swelling/Deswelling Kinetics of Comb-Type Grafted Poly(n-Isopropylacrylamide) Hydrogels", Macromolecular Symposia, May 1996, vol. 109, pp. 41-53.

Kang et al., "Explicit analytic solution for heat and mass transfer in a desiccant wheel using a simplified model", Energy, Dec. 2015, vol. 93, Part 2, pp. 2559-2567.

Kim et al., "Water harvesting from air with metal-organic frameworks powered by natural sunlight", Science, Apr. 2017, vol. 356, No. 6336, pp. 430-434.

Kim et al., Adsorption-based atmospheric water harvesting device for arid climates, Nature Communications, 2018, vol. 9, No. 1191, pp. 1-8.

Kocher, "Analyzing the Opportunities for NIPAAm Dehumidification in Air Conditioning Systems", Abstract, Arizona State University, School for Engineering of Matter, Transport and Energy, Apr. 2019, p. 1-1.

Kodama et al., "The use of psychrometric charts for the optimisation of a thermal swing desiccant wheel", Applied Thermal Engineering, 2001, vol. 21, No. 16, pp. 1657-1674.

Kubota et al., "Water vapor adsorption on poly(N-isopropylacrylamide) gel cross-linked with N, N' methylenebisacrylamide", Materials Today Communications, 2020, vol. 22, No. 100804, pp. 1-7.

Matsumoto et al., "Thermo-responsive gels that absorb moisture and ooze water", Nature Communications, 2018, vol. 9, No. 2315, pp. 1-7.

Nawaz et al., "Separate Sensible and Latent Cooling System: A Preliminary Analysis of a Novel Approach", ORML/TM-2017/479, Oak Ridge National Laboratory Aug. 31, 2017, pp. 1-20.

Perelman et al., "Preparation and Characterization of a pH- and Thermally Responsive Poly(N-isopropylacrylamide-coacrylic acid)/Porous SiO2 Hybrid", Advanced Functional Materials, 2010, vol. 20, pp. 826-833.

Rafique et al., "A review on desiccant based evaporative cooling systems. Renewable and Sustainable Energy Reviews", May 2015, vol. 45, pp. 145-159.

Rorrer et al., "Combining Reclaimed PET with Bio-based Monomers Enables Plastics Upcycling", Joule, Apr. 2019, vol. 3, No. 4, pp. 1006-1027.

Sedlacek et al., "Poly(2-amino-2-oxazoline)s: a new class of thermoresponsive polymers", Polymer Chemistry, 2019, vol. 10, pp. 4683-4689.

Sphaier et al., "Analysis of heat and mass transfer in porous sorbents used in rotary regenerators", International Journal of Heat and Mass Transfer, Jul. 2004, vol. 47, Nos. 14-16, pp. 3415-3430.

Stabat et al., "Heat and mass transfer modeling in rotary desiccant dehumidifiers", Applied Energy, May 2009, vol. 86, No. 5, pp. 762-771.

Stenström, "Drying of Paper: A Review 2000-2018", Drying Technology, 2020, vol. 38, No. 7, pp. 825-845.

Sultan et al., "Optimization of adsorption isotherm types for desiccant air-conditioning applications", Renewable Energy, Jun. 2018, vol. 121, pp. 441-450.

Xu et al., "Sunlight-Induced Photo-Thermochromic Supramolecular Nanocomposite Hydrogel Film for Energy-Saving Smart Window", Solar RRL, 2018, vol. 2, No. 1800204, pp. 1-10.

Xu et al., "Performance Analysis of a Combined Absorption Refrigeration-Liquid Desiccant Dehumidification THIC System Driven by Low-Grade Heat Source." Journal of Thermal Science, 2020, vol. 29, No. 5, pp. 1193-1205.

Yang et al., "Development of solid super desiccants based on a polymeric superabsorbent hydrogel composite", Royal Society of Chemistry, 2015, vol. 59583-59590.

Yamaguchi et al., "Numerical and experimental performance analysis of rotary desiccant wheels", International Journal of Heat and Mass Transfer, 2013, vol. 60, pp. 51-60.

Yamashita et al., "Two-Step Imprinting Procedure of Inter-Penetrating Polymer Network-Type Stimuli-Responsive Hydrogel-Adsorbents", Polymer Journal, 2003, vol. 35, No. 7, pp. 545-550.

Zeng et al., "Multi-layer temperature-responsive hydrogel for forward-osmosis desalination with high permeable flux and fast water release", Desalination, 2019, vol. 459, pp. 105-113.

Zhang et al., "A simulation study of heat and mass transfer in a honeycombed rotary desiccant dehumidifier", Applied Thermal Engineering, 2003, vol. 23, No. 8, pp. 989-1003.

Zhang et al., "Graft-type poly(N-isopropylacrylamide-co-acrylic acid) microgels exhibiting rapid thermo- and pH-responsive properties", Polymer, 2008, vol. 45, pp. 2595-2603.

Zhao et al., "Thermoresponsive Copolymer-Based Draw Solution for Seawater Desalination in a Combined Process of Forward Osmosis and Membrane Distillation", Desalination, Sep. 2014, vol. 348, pp. 26-32.

Zhao et al., "Super Moisture-Absorbent Gels for All-Weather Atmospheric Water Harvesting", Advanced Materials, 2019, vol. 31, No. 1806446, pp. 1-7.

Zheng et al., "Recent progress on desiccant materials for solid desiccant cooling systems", Energy, Sep. 2014, vol. 74, pp. 280-294.

Zheng et al., "Tough Al alginate/Poly(N-isopropylacrylamide) Hydrogel with Tunable LCST for Soft Robotics", Applied Materials & Interfaces, 2015, vol. 7, pp. 1758-1764.

\* cited by examiner

Collapsed hydrogel
5,000 RPM, 30 min

Reswollen in
Deionized Water 4h a)

b)

a)

b)

SUPER-ADSORBING POROUS THERMO-RESPONSIVE DESICCANTS

CROSS-REFERENCE TO RELATED APPLICATIONS

This application claims priority from U.S. Provisional Patent Application No. 63/074,072 filed on Sep. 3, 2020, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

Heating, ventilation, and air conditioning (HVAC) equipment may account for about 40% of the energy consumed in buildings and is predicted to increase by approximately 6.2% annually. Solid desiccant air conditioning (SDAC) systems have been proposed as an alternative to conventional vapor compression refrigeration systems (VCRS). Hygroscopic adsorbents or desiccants, with high affinities for water vapor, can be used to control humidity and temperature in buildings when applied in desiccant dehumidification or closed-cycle adsorption heat pumps (AHP). The coefficient of performance (COP) of those technologies is fundamentally limited by the properties of the adsorbent materials (i.e., the desiccants) and their associated heat and mass transfer characteristics. The low COP in the state of the art AHP systems is primarily due to the adsorbent bed performance. Typical solid desiccants, such as silica gels, present a tradeoff between their adsorption and desorption capability due to their fixed affinity to adsorbates with either low adsorption capacities or high regeneration temperatures. An ideal absorbent would possess high adsorption capacity (AdC), which is the vapor uptake per unit mass of the solid adsorbent, high adsorption/desorption rate, and low regeneration temperature ($T_{reg}$). However, incumbent adsorbents have either low AdC or high $T_{reg}$. Thus, there remains a need for improved solid desiccants SDAC systems if significant energy savings are to be made in future HVAC systems and equipment.

SUMMARY

An aspect of the present disclosure is a composition of a thermo-responsive desiccant, the composition including a thermo-responsive polymer, and a hygroscopic agent, in which the thermo-responsive desiccant has a lower critical solution temperature (LCST) transition, the thermo-responsive desiccant is configured to adsorb a water at a temperature below the LCST transition, and the thermo-responsive desiccant is configured to desorb the water at a temperature above the LCST transition. In some embodiments, a main chain including the thermo-responsive polymer is covalently bonded to a plurality of side chains comprised of the hygroscopic agent forming a grafted polymer. In some embodiments, the thermo-responsive polymer is interlaced with the hygroscopic agent forming an interpenetrating network, and the hygroscopic agent is not covalently bonded to the hygroscopic agent. In some embodiments, the thermo-responsive polymer is covalently bonded to the hygroscopic agent, resulting in a copolymer. In some embodiments, the thermo-responsive polymer includes at least one of poly(N-isopropylacrylamide) (PNIPAAm), poly[2-dimethylamino]ethyl methacrylate, hydroxypropylcellulose, poly(vinylcaprolactame), poly-2-isopropyl-2-oxazoline, or polyvinyl methyl ether. In some embodiments, the hygroscopic agent comprises an inorganic salt. In some embodiments, the inorganic salt includes at least one of calcium chloride ($CaCl_2$)), lithium chloride (LiCl), aluminum chloride ($AlCl_3$), sodium chloride (NaCl), sodium nitrate ($NaNO_3$), sodium hydroxide (NaOH), potassium nitrate ($KNO_3$), potassium chloride (KCl), potassium carbonate ($K_2CO_3$), potassium sulfate ($K_2SO_4$), a potassium phosphate, potassium hydroxide (KOH), magnesium chloride ($MgCl_2$), magnesium nitrate ($Mg(NO_3)_2$), magnesium sulfate ($MgSO_4$), magnesium iodide ($MgI_2$), calcium chloride ($CaCl_2$)), calcium nitrate ($Ca(NO_3)_2$), zinc chloride ($ZnCl_2$), zinc nitrate ($ZnNO_3$), zinc sulfate ($ZnSO_4$), iron chloride ($FeCl_3$), lithium bromide (LiBr), or lithium chloride (LiCl). In some embodiments, the hygroscopic agent includes an organic polyelectrolyte. In some embodiments, the organic polyelectrolyte includes at least one of sodium acrylate, poly(sodium 4-styrenesulfonate), chlorine-doped polypyrrole (PPy-Cl), a sodium polyacrylate, poly(ethylene oxide), an alginate, or a cross-linked bipolar polymer. In some embodiments, a crosslinker is also included. In some embodiments, the crosslinker includes at least one of N,N'-methylenebisacrylamide (MBAA), N,N'-ethylenebisacrylamide, N,N'-propylenebisacrylamide, polyethylene glycol diacrylate, divinylbenzene (para, ortho, meta), bis(2-methacryloyl)oxyethyl disulfide, 1,4-Bis(4-vinylphenoxy)butane, or triethylene glycol dimethacrylate. In some embodiments, the thermo-responsive desiccant has an adsorption capacity between about 1.5 g moisture/g composition and about 4 g moisture/g composition when at a temperature below the LCST transition. In some embodiments, the thermo-responsive desiccant has an adsorption rate between greater than 0 g moisture/g composition-hour and about 3 g moisture/g composition-hour when at a temperature below the LCST transition. In some embodiments, the thermo-responsive desiccant has a desorption rate between greater than 0 g moisture/g composition-hour and about 3 g moisture/g composition-hour when at a temperature above the LCST transition.

An aspect of the present disclosure is a device configured to remove a water from a substantially continuous sheet, the device includes a thermo-responsive desiccant, and a drum comprising the thermo-responsive desiccant, in which the thermo-responsive desiccant includes a thermo-responsive polymer, and a hygroscopic agent, in which the thermo-responsive desiccant has a lower critical solution temperature (LCST) transition, the thermo-responsive desiccant is configured to adsorb a water at a temperature below the LCST transition, and the thermo-responsive desiccant is configured to desorb the water at a temperature above the LCST transition, the drum is configured to rotate and direct the substantially continuous sheet through a first zone and a second zone, while in the first zone, the thermo-responsive desiccant is configured to adsorb at least a portion of the water contained in the substantially continuous sheet at a temperature below the LCST transition, while in the second zone, the thermo-responsive desiccant is configured to desorb the water at a temperature above the LCST transition, and the water is desorbed in a liquid phase. In some embodiments, the substantially continuous sheet is a paper pulp.

An aspect of the present disclosure is a device configured to remove a water from a granular material, the device including a thermo-responsive desiccant, a first drum comprising the thermo-responsive desiccant, a second drum comprising the thermo-responsive desiccant, in which the thermo-responsive desiccant includes a thermo-responsive polymer, and a hygroscopic agent; in which the thermo-responsive desiccant has a lower critical solution temperature (LCST) transition, the thermo-responsive desiccant is configured to adsorb a water at a temperature below the LCST transition, and the thermo-responsive desiccant is configured to desorb the water at a temperature above the LCST transition, the first drum and the second drum are positioned adjacent to each other to form a gap between the first drum and the second drum, the first drum rotates in a clockwise direction and the second drum rotates in a counterclockwise direction, the gap is configured to receive the granular material, each drum is configured to be operated at a temperature below the LCST transition while at least in the gap, such that at least a portion of the water adsorbed by the thermo-responsive desiccant and removed from the granular material, each drum is configured to rotate to the second zone operated at a temperature above the LCST transition, such that the water is desorbed from the thermo-responsive desiccant, and the water is desorbed in the liquid phase. In some embodiments, the granular material comprises a food product.

BRIEF DESCRIPTION OF THE DRAWINGS

Some embodiments of the present disclosure are illustrated in the referenced figures of the drawings. It is intended that the embodiments and figures disclosed herein are to be considered illustrative rather than limiting.

REFERENCE NUMERALS

Figure 1A:
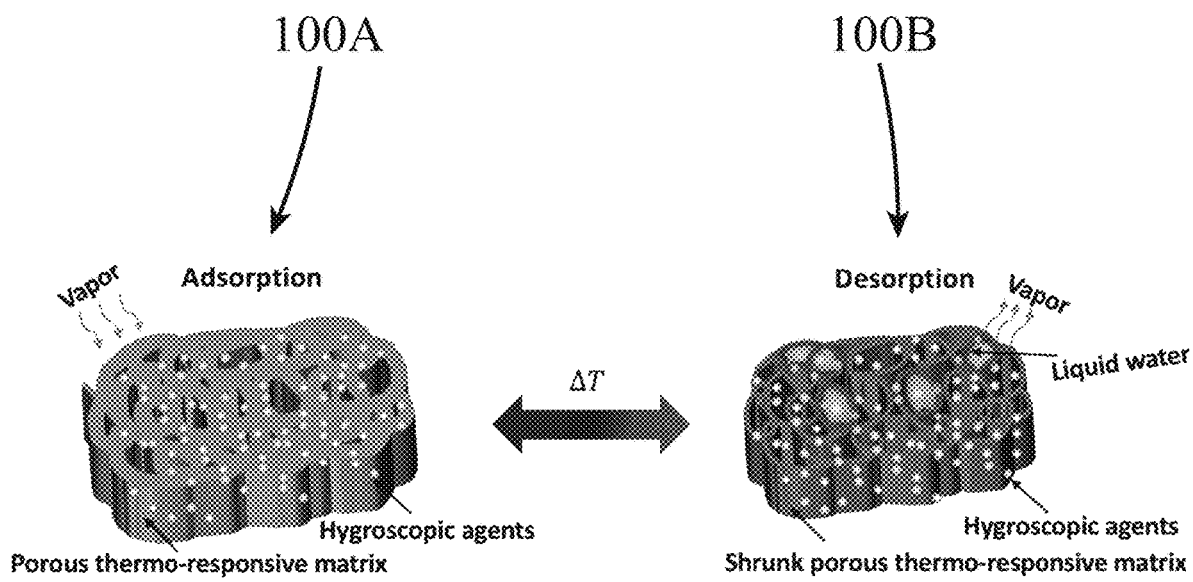
FIG. 1A illustrates a schematic of an exemplary super-adsorbing, porous, thermo-responsive hydrogel composite (TRHC) desiccant, according to some embodiments of the present disclosure.

100 . . . thermo-responsive hydrogel composite (TRHC) desiccant
110 . . . thermo-responsive polymer
120 . . . crosslinker
130 . . . hygroscopic agent
300 . . . adsorption heat exchanger
310 . . . matrix material
400 . . . air conditioning system
410 . . . rotating container
420 . . . gas inlet stream
430 . . . gas outlet stream
440 . . . regeneration gas inlet stream
450 . . . regeneration gas outlet stream
470 . . . water adsorbing zone
480 . . . water desorbing zone
490 . . . water stream (not shown)
491 . . . wall
492 . . . TRHC desiccant layer
493 . . . volume for gas flow

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to +1%, ±0.9%, ±0.8%, ±0.7%, ±0.6%, +0.5%, ±0.4%, ±0.3%, ±0.2%, or ±0.1% of a specific numeric value or target.

Among other things, the present disclosure relates to thermo-responsive hydrogel composite (TRHC) desiccants having, among other things, relatively high adsorption capacities, relatively fast adsorption/desorption rates, and relatively low regeneration temperatures ($T_{reg}$) compared to traditional desiccants. The TRHC desiccant may be composed of a thermo-responsive polymer and a hygroscopic agent. In some embodiments, the TRHC desiccant may include a cross linker. The thermo-responsive polymer and the hygroscopic agent may be connected to form the TRHC in one of three ways: 1) as a grafted copolymer, 2) as an interpenetrating network, and 3), as a copolymer.

As shown herein, high water adsorption capacities may result from the hygroscopic nature of the polymers and/or inorganic salts. In addition, water desorption rates at low temperatures with small thermal energy requirements may result from t TRHC desiccants, which become hydrophobic and release water during shrinkage above their "lower critical solution temperatures" (LCST), which can range between about −10° C. and about 150° C. and can be tuned (i.e., controlled) depending on, among other things, the composition of the TRHC desiccant. This results in lower energy requirements for regenerating the TRHC desiccants, largely due to a reduction in the enthalpy of vaporization. Fast water adsorption/desorption rates may be achieved from the engineered porous structures (e.g., resulting from freeze drying) of the TRHC desiccants. Within buildings, these super-adsorbing TRHC desiccants may be used in air conditioning systems to dehumidify air, within a novel and high coefficient of performance (COP) adsorption heat pump process, and/or within a building envelope to enable moisture storage and release. The composition and systems described herein may also have the potential for applications beyond buildings, such as harvesting water from air or from the industrial drying of films (e.g., paper pulp, food products, etc.). In some embodiments of the present disclosure, the materials described herein may have applications for controlled moisture storage and/or extraction in building envelopes, energy efficient water harvesting from air to help mitigate water scarcity, and/or industrial drying of thin films.

Figure 1B:
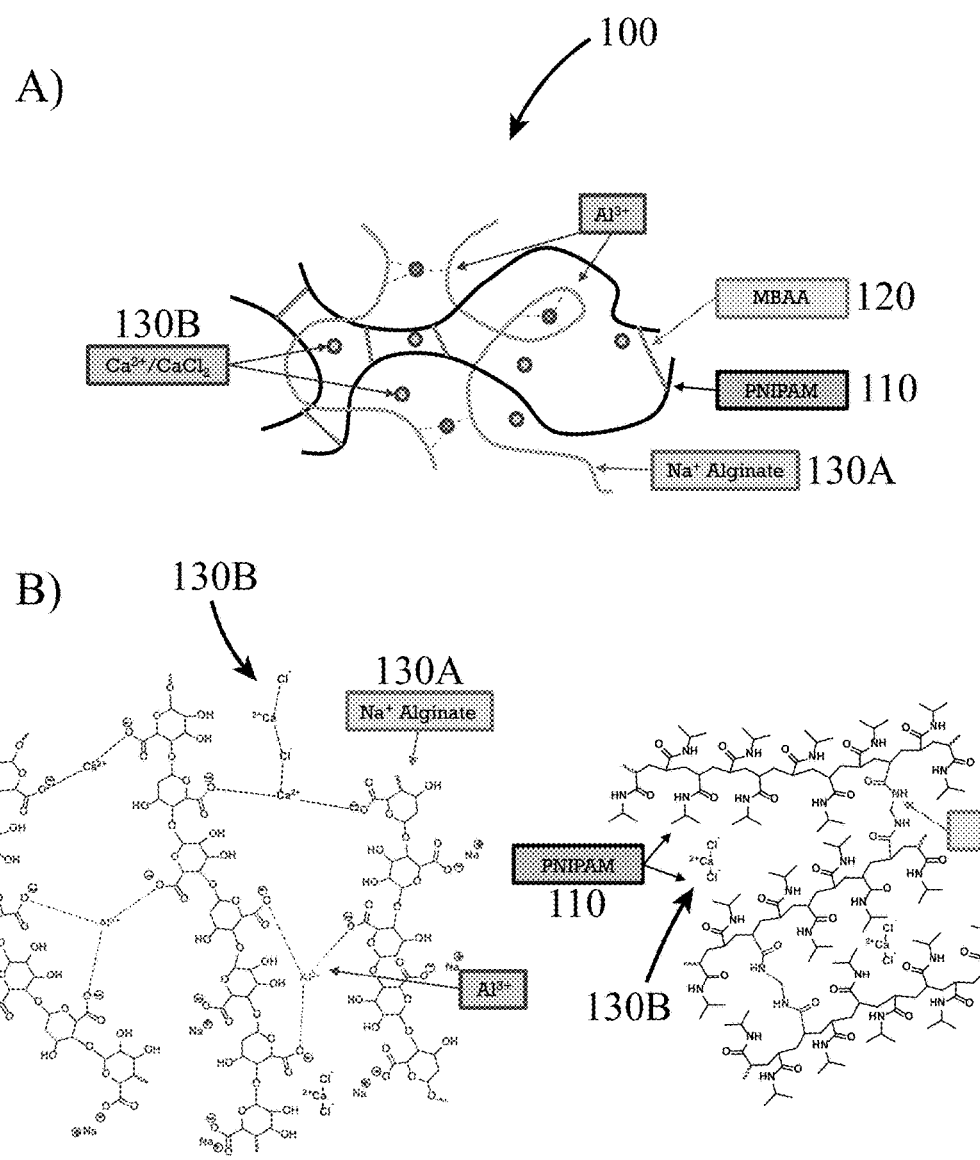
FIG. 1B, both Panels A) and B) illustrate a thermo-responsive hydrogel composite (TRHC) desiccant, according to some embodiments of the present disclosure.

FIG. 1A illustrates a macroscopic view of an exemplary super-adsorbing porous TRHC desiccant 100, according to some embodiments of the present disclosure. The TRHC desiccant 100A on the left illustrates the process of the adsorption of water vapor into the TRHC desiccant and the TRHC desiccant 100B on the right illustrates the process of desorption of water from the TRHC desiccant. FIG. 1B illustrates a molecular view of an exemplary super-adsorbing porous TRHC desiccant 100, according to some embodiments of the present disclosure. FIG. 1B illustrates that, in general, a TRHC desiccant 100 may be composed of three constituent parts: a thermo-responsive polymer 110, a crosslinker 120, and a hygroscopic agent 130, where a hygroscopic agent 130 may be an organic compound 130A and/or an inorganic compound 130B. Panel A) of FIG. 1B illustrates that the components of a TRHC desiccant 100 may be randomly mixed but physically connected via covalent and/or ionic interactions. In some embodiments of the present disclosure, in addition to covalent and ionic bonds, the various components of a TRHC desiccant 100 may interact via hydrogen bonding, van der Waals forces, and/or other charge interactions.

An example of a thermo-responsive polymer 110 is poly (N-isopropylacrylamide) (PNIPAAm). Examples of inorganic hygroscopic agents 130B include inorganic salts, such as calcium chloride ($CaCl_2$), lithium chloride (LiCl), and/or lithium bromide (LiBr), whereas examples of organic hygroscopic agents 130A include organic polyelectrolytes such as sodium acrylate, poly(sodium 4-styrenesulfonate), PPy-Cl (chlorine-doped polypyrrole), sodium polyacrylates, alginates, and/or cross-linked bipolar [—$NR^{3+}$ and —$SO^{3-}$] polymers. In some embodiments of the present disclosure, a TRHC desiccant can be constructed of a double network thermo-responsive polymer, composed of, for example, PNIPAM hydrogel and an alginate gel. Among other things, an alginate gel may be used to improve the mechanical strength of the resultant TRHC desiccants. Further examples of thermo-responsive polymers 110 include poly[2-dimethylamino]ethyl methacrylate, poly(vinylcaprolactame), and polyvinyl methyl ether. The molecular structure of sodium alginate, an organic hygroscopic agent 130A with inorganic hygroscopic agents 130B, $Al^{3+}$ and $CaCl_2$), as well as a thermo-responsive polymer 110, PNIPAM, in a resin network due to the use of a crosslinker 120, N,N'-methylenebisacrylamide (MBAA). This resin structure also includes an inorganic hygroscopic agent, calcium chloride ($CaCl_2$)). The structure of PPy-Cl is shown below as Structure 1:

Structure 1

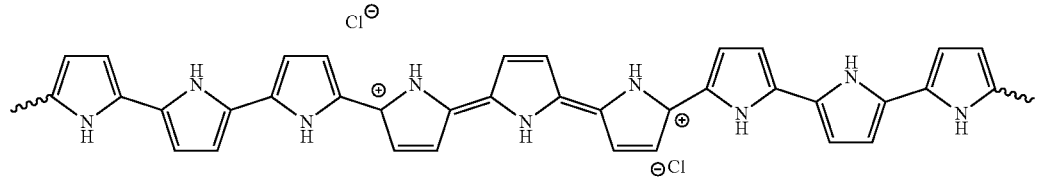

In general, there are at least two types of crosslinkers, where one connects different polymer chains through covalent bonds, and the other through ionic bonds. In some embodiments of the present disclosure, where a TRHC desiccant 100 is constructed of a thermo-responsive polymer 110 and an inorganic hygroscopic agent 130B (e.g., a salt), a crosslinker 120 may be used to crosslink the thermo-responsive polymer 110 to form a thermo-responsive gel. In some embodiments this may result in an interpenetrating network. An interpenetrating network (or interpenetrating polymer network) is a network made of two or more polymers which are at least partially interlaced on a polymer scale, but not covalently bonded together. In some embodiments, an interpenetrating network may result from a thermo-responsive polymer being at least partially interlaced with a hygroscopic agent. In some embodiments of the present disclosure, where a TRHC desiccant is constructed of a thermo-responsive polymer 110 and an organic hygroscopic agent 130A (e.g., a polyelectrolyte), a crosslinker may be used to crosslink at least one of thermo-responsive polymer 110 and/or the organic hygroscopic agent 130A (e.g., a polyelectrolyte). An example of a cross-linker is MBAA to crosslink thermo-responsive polymer 110. Another crosslinker is calcium chloride ($CaCl_2$)), which both ionically crosslinks organic hygroscopic agent 130A and acts as an inorganic hygroscopic agent.

In some embodiments, a TRHC desiccant may be synthesized, which has both a high adsorption capacity (AdC) (approximately 10× higher than secondary organic aerosol (SOA) solid desiccants, (e.g., silica gels) and a low $T_{reg}$ (less than about 50° C.). In some embodiments, a TRHC desiccant may be synthesized by freeze-drying at least one thermo-responsive polymer with at least one hygroscopic agent, resulting in a porous polymeric desiccant having the physical properties and performance metrics of a TRHC desiccant. In some embodiments of the present disclosure, TRHC desiccants may be synthesized by freeze drying. Freeze drying, also known as lyophilization or cryodesiccation, is a low temperature dehydration process that involves freezing the product, lowering pressure, then removing the ice by sublimation. It is a water removal process typically used to preserve material structures. As described herein, freeze drying may be used to remove moisture (i.e., water) contained inside desiccants and/or the materials used to synthesize desiccants to create porous structures for enhanced mass transfer. In some embodiments of the present disclosure, the porous structures resulting from freeze drying copolymers of thermo-responsive polymers and/or hygroscopic agents may be combined with hygroscopic inorganic salts, resulting in TRHC desiccants having superior performance properties.

A hygroscopic agent may have a sufficiently high ionic strength (e.g., greater than approximately 0.1 M) to enable it to behave like a vapor drawing agent during adsorption. In some embodiments of the present disclosure, a thermo-responsive polymer may drastically change its affinity to water upon phase transition at its LCST, resulting in a shrinkage in the material and a release of water to facilitate fast desorption at a relatively low $T_{reg}$ above its LCST (see FIG. 1A).

Figure 2:
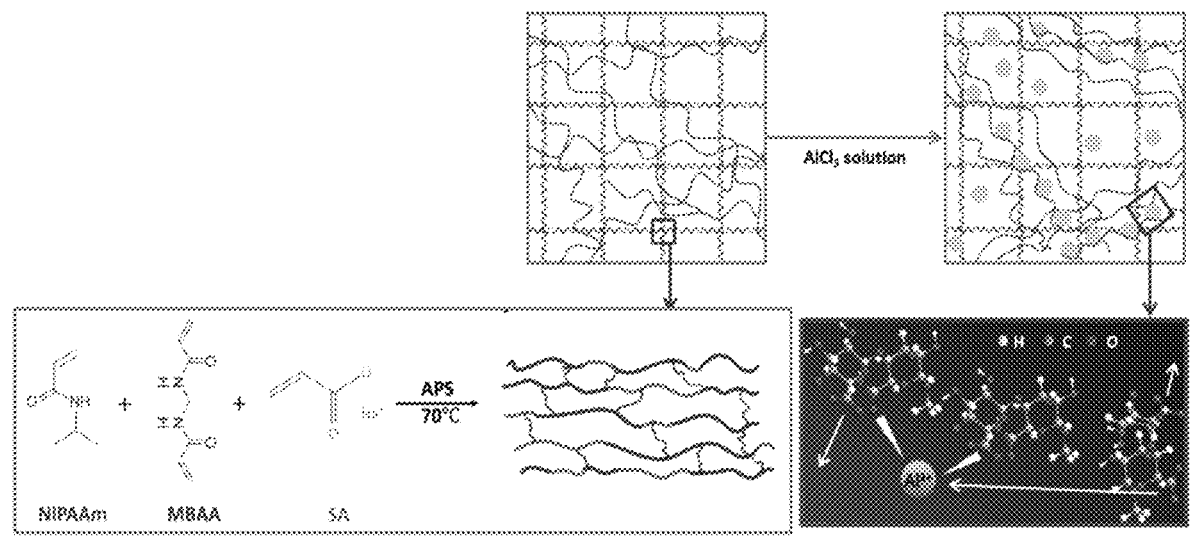
FIG. 2 illustrates an exemplary reaction of a thermo-responsive polymer, a cross-linker, and hygroscopic compound for producing a TRHC desiccant, according to some embodiments of the present disclosure.

One example of a TRHC desiccant composed of thermo-responsive polymer and organic hygroscopic agent is illustrated in FIG. 2. First, a thermo-responsive monomer, N-isopropylacrylamide (NIPAAm), and an organic hygroscopic agent, sodium acrylate (SA), are reacted with a crosslinker, MBAA, using an initiator, ammonium persulfate (APS), at about 70° C. for a period of time between 6 hours and 12 hours. This may result in a copolymer structure for the TRHC. This copolymer structure may be mixed with an additional hygroscopic agent, such as aluminum chloride ($AlCl_3$). A molecular view of the copolymer structure with $AlCl_3$ is also shown in FIG. 2. Alternatively, the TRHC desiccant can be synthesized while below the LCST by reaction of NIPAAm, MBAA, and APS with an accelerator, such as tetramethylethylenediamine (TEMED), at room temperature (approximately 25° C.) for a period of time between about 1 minute and about 24 hours. In this example, the resultant crosslinked copolymer was freeze dried overnight to remove the water and form the final targeted, porous TRHC desiccant. As illustrated in FIG. 2, the resultant TRHC copolymer may reversibly switch between a first transparent hydrophilic state (below the LCST) to a second opaque hydrophobic state (above the LCST), corresponding to the adsorption of water and the desorption of water, respectively.

As described herein, a study was completed where a thermo-responsive material content, hygroscopic agents' (e.g., inorganic ones and/or organic ones) chemical nature and contents, and synthesis conditions were varied to study their effects on, among other things, AdC. Exemplary TRHC desiccants were identified that achieve a target adsorption capacity of at least 4 g/g (water adsorbed/desiccant), which is 10 times higher than SOA solid desiccants such (e.g., silica gel) and having a $T_{reg}$ of about 50° C. or less, which would allow these TRHC desiccants to utilize over 75% of the currently available industrial waste heat at below about 100° C. generated in the United States. In some embodiments of the present disclosure, the $T_{reg}$ may be tuned to a range between about 0° C. and about 100° C., depending on the application, by adjusting the composition of the TRHC desiccants constituents, e.g., thermo-responsive polymers, crosslinkers, and/or hygroscopic agents.

In some embodiments of the present disclosure, a TRHC desiccant can adsorb between about 0.5 g/g and about 1.0 g/g (moisture adsorbed/desiccant) at about 200° C. at 70% relative humidity (RH). In some embodiments of the present disclosure, a TRHC desiccant may have an AdC between about 1.5 g/g and about 4 g/g (moisture adsorbed/desiccant) at about 20° C. at 98% relative humidity (RH). In some embodiments of the present disclosure, a TRHC desiccant may have an AdC of at least 0.5 g/g (moisture adsorbed/desiccant), a high adsorption rate (of at least 0.5 g/g-hour at 20° C. at 70% RH), and a high desorption rate (of at least 0.4 g/g-hour at 50° C. at 30% RH). In some embodiments of the present disclosure, a TRHC desiccant may be stable and provide reliable performance, even when repeatedly cycled between a first adsorbed state and a second desorbed state as described above (see FIG. 1A) (greater than 95% performance retention after 10 cycles). In some embodiments of the present disclosure, a TRHC desiccant may have an AdC of at least 1.5 g/g (moisture adsorbed/desiccant), a high adsorption rate (of at least 1.0 g/g-hour), and a high desorption rate (of at least 1.2 g/g-hour). In some embodiments of the present disclosure, a TRHC desiccant may include a hybrid adsorbent that has a stable, reliable performance, even when repeatedly cycled (greater than 95% performance retention after 100 cycles).

In some embodiments of the present disclosure, a porous structure (e.g. resulting from freeze drying process) may be incorporated into a TRHC desiccant to relieve the mechanical stresses that may be present during adsorption/desorption cycling, which may allow water vapor to more easily access the inner mass and/or surface areas of the TRHC desiccant and/or induce capillary condensation (which can occur at mesoporous scales between about 2 nm and about 50 nm). Freeze-drying may be used to create a microporous and/or nanoporous structure in TRHC desiccants by controlling the processing parameters (e.g., freezing temperature and duration). As described herein, a heat and mass transfer model has been used to optimize the porous structure of TRHC desiccants for high adsorption/desorption kinetics (in some instances two times higher than SOA solid desiccants). Among other things, results from this model have validated that the use of a porous structure can relieve the mechanical stresses during hydration/dehydration cycling and can allow water vapor to access the inner part of the composite more easily. In some embodiments of the present disclosure, a porous structure with nanometer-scale to micrometer-scale pore sizes may be manufactured by using a polymeric porogen.

In some embodiments of the present disclosure, a TRHC desiccant as described herein may minimize the evaporation of water during regeneration, which is necessary in traditional desiccants (e.g., silica gel). By releasing the adsorbed moisture in the liquid phase, due to the unique LCST phase transition initialized by low-grade thermal energy, the heat of vaporization of water from liquid to vapor is avoided and high COP values can be obtained. A further aspect of the present disclosure are devices and/or systems that utilize TRHC desiccants as described herein, some of which are described in detail below.

In some embodiments of the present disclosure, a hygroscopic polymer (acrylic acid) may be obtained from biomass-derived sources. Utilizing acrylic acid and other biomass-derived monomers may result in lower manufacture energies and carbon dioxide emissions in the final manufacture of the polymer. In some embodiments of the present disclosure, a precursor proposed in a route for manufacturing a TRHC desiccant may be obtained from the esterification of acrylic acid with amines to from a thermos-responsive materials and diamines to form a cross-linker. A high degree of customization is available, and polymers may be modified pre- or post-polymerization.

The following paragraphs provide more extensive lists of the components that may be utilized and/or combined to synthesized TRHC desiccants 100, as described herein.

Thermo-responsive polymers 110 may include a polymer that includes a functional group that includes at least one of an amide, a methacrylate/acrylate, and/or an ether. In some embodiments of the present disclosure, such a functional group may be paired with at least one of a hydrophobic group and/or aliphatic group. In some embodiments of the present disclosure, a thermo-responsive polymer 110 may include at least one of poly(N-isopropylacrylamide) (PNIPAM) and/or a PNIPAM derivative. PNIPAM derivatives include (LCSTs shown in brackets) poly(N-n-propylacrylamide) (PNNPAM) (10° C.), poly(N-cyclopropylacrylamide) (PNCPAM) (53° C.), poly(N,N-diethylacrylamide) (PDEAM) (33° C.), poly(N-(NO-isobutylcarbamide)propyl methacrylamide) (PiBuCPMA) (13° C.), poly(N-(2-methoxy-1,3-dioxan-5-yl) methacrylamide) (PNMM) (22° C.), poly(N-vinylisobutyramide) (PNVIBA) (39° C.), poly(N-vinyl-n-butyramide) (PNVBA) (32° C.), poly(N-acryloylpyrrolidine) (PAPR) (51° C.), poly(N-(NO-ethylcarbamido)propyl methacrylamide) (PiBuCPMA) (50-57° C.), poly(N-(1-hydroxymethyl)propylmethacrylamide) (PHMPMA) (30-34° C.), poly[N-(2,2-dimethyl-1,3-dioxolane)methyl] acrylamide (PDMDOMA) (23° C.), poly([N-(2,2-dimethyl-1,3-dioxolane)methyl] acrylamide-co-[N-(2,3-dihydroxyl-n-propyl)] acrylamide) (23-49° C.), poly(N-(2-ethoxy-1,3-dioxan-5-yl) methacrylamide) (PNEM) (52° C.), poly(N-(2,2-di-methyl-1,3-dioxan-5-yl) methacrylamide) (PNDMM) (15° C.), poly(N-(2,2-di-methyl-1,3-dioxan-5-yl) acrylamide) (PNDMA), copolymer of N-isopropyl-methacrylamide and a methacrylamide monomer with labile hydrazone linkages (13-44° C.), poly(trans-N-(2-ethoxy-1,3-dioxan-5-yl)acrylamide) (PtNEA) (13.7-17.5° C.), and poly(N-acryloyl-NO-propylpiperazine) (PNANPP) (37° C.).

In some embodiments of the present disclosure, a thermo-responsive polymer 110 may include a ring system such as poly(N-vinylcaprolactam) (PVCa) (32° C.) and/or poly(N-vinylpyrrolidone) (PVPy) (30° C.). In some embodiments of the present disclosure, a thermo-responsive polymer 110 may include a methacrylate and/or a methacrylate complex such as at least one of poly[N-(2-methacryloyloxyethyl) pyrrolidone] (PNMP) (52° C.), Poly(N-ethylpyrrolidine methacrylate) (PEPyM) (15° C.), poly(dimethylaminoethyl methacrylate) (PDMAEMA) LCST=14-50° C., poly(methacrylamide) (PMAAm) (57° C.), poly(2-(2-methoxyethoxy)ethyl methacrylate) (PMEO2MA) (26° C.), poly(2-[2-(2-methoxyethoxy)ethoxy]ethyl methacrylate) (PMEO3MA) (52° C.), poly(oligo(ethylene glycol) methacrylate) (POEGMA) (60-90° C.), poly([oligo(2-ethyl-2-oxazoline) methacrylate]-co-(methyl methacrylate)) (35-80° C.), poly(N-acryloyl-1-proline methyl ester) poly(A-Pro-OMe) (15-20° C.), poly(N-acryloyl-L-valine NO-methylamide) (PAVMA) (6-19° C.), Poly(N-isopropylacrylamide)-b-poly[3-(N-(3-methacrylamidopropyl)-N,N-dimethyl)ammoniopropane sulfonate] (PNIPAM-b-PSPP) (9-19° C.), poly(N-acryloylglycinamide) (PNAGA) (22-23° C.), and/or poly(N-acryloylasparaginamide) (PNAAAM) (4-28° C.).

In some embodiments of the present disclosure, a thermo-responsive polymer 110 may include an acrylate such as at least one of poly[(di(ethylene glycol) ethyl ether acrylate)-co-(oligoethylene glycol acrylate)] (P(DEGA-co-OEGA) (15-90° C.) and/or poly(2-hydroxypropylacrylate) (PUPA) (30-60° C.). In some embodiments of the present disclosure, a thermo-responsive polymer 110 may include a polyether such as at least one of poly(ethylene oxide) (85° C.), poly(propylene oxide) (0-50° C.), poly(ethoxyethyl glycidal ether) (30-40° C.), and/or poly(glycidol-co-glycidol acetate) (4-100° C.). In some embodiments of the present disclosure, a thermo-responsive polymer 110 may include a styrene such as poly(4-vinylbenzyl methoxytetrakis(oxyethylene) ether) (39° C.). In some embodiments of the present disclosure, a thermo-responsive polymer 110 may include a phosphazene such as at least one of poly[bis((ethoxyethoxy)ethoxy)phosphazene] (PBEEP) (38° C.) and/or poly[bis(2,3-bis(2-methoxyethoxy)propanoxy) phosphazene] (PBBMEPP) (38° C.). In some embodiments of the present disclosure, a thermo-responsive polymer 110 may include a vinyl ether such as at least one of poly(methyl vinyl ether) (PMVE) poly(2-(2-ethoxy)ethoxyethyl (35-36° C.), poly(2-(2-ethoxy)ethoxyethyl vinyl ether) (PEOEOVE) (41° C.), and/or poly(2-methoxyethyl vinyl ether) (PMOVE) (70° C.).

In some embodiments of the present disclosure, a thermo-responsive polymer 110 may include an oxazoline such as at least one of poly(2-ethyl-2-oxazoline) (PEOx) (62-65° C.), poly(2-isopropyl-2-oxazoline) (PiPOx) (36° C.), and/or poly(2-n-propyl-2-oxazoline) (PnPOx) poly([oligo(2-ethyl-2-oxazoline) (36° C.). In some embodiments of the present disclosure, a thermo-responsive polymer 110 may include an oxazine such as at least one of poly(2-ethyl-2-oxazine) (PEtOZI) (11-13° C.) and/or poly(2-n-propyl-2-oxazine) (PnPropOZI) (56° C.).

In some embodiments of the present disclosure, a thermo-responsive polymer 110 may include at least one of poly(endo,exo-bicyclo[2.2.1]hept-5-ene-2,3-dicarboxylic acid, bis[2-[2-(2-ethoxyethoxy)ethoxy]ethyl] ester) (25° C.), oligo(ethylene oxide)-grafted polylactide (19-27° C.), P(Val-Pro-Gly-Val-Gly) (27° C.), Val-Pro-Gly-Val-Gly and oligo (ethylene glycol) grafted polynorbornene (16-30° C.), Val-Pro-Gly-Val-Gly derived polymethacrylate (15-55° C.), derivatives of poly(N-substituted a/b-asparagine) (25-100° C.), ethyl and butyl modified polyglycine (20-60° C.), PEG-ylated poly-L-glutamate (30-57° C.), poly(vinyl alcohol-co-vinyl acetal) (P(VOH-co-VAc)) (17-41° C.), butyl glycidyl ether modified starch (5-33° C.), and/or Poly(acrylonitrile-co-acrylamide) (P(An-co-AM)) (6-60°.

In some embodiments of the present disclosure, a crosslinker 120 may include at least one of a chemical crosslinker and/or a physical crosslinker. Examples of chemical crosslinkers include N,N'-methylenebisacrylamide (MBAA), N,N'-ethylenebisacrylamide, N,N'-propylenebisacrylamide, polyethylene glycol diacrylate, divinylbenzene (para, ortho, meta), bis(2-methacryloyl)oxyethyl disulfide, 1,4-Bis(4-vinylphenoxy)butane, and/or triethylene glycol dimethacrylate. In some embodiments of the present disclosure, a crosslinker may include a non-divinyl crosslinker such as at least one of a crosslinker resulting from converting acrylic acid to hydrazine and reacting the hydrazine with vinyl aldehyde, a crosslinker resulting from the copolymerization of styrene in the presence of UV radiation, $Fe_3O_4$ nanoparticles, phytic acid, and/or an N-hydroxysuccinimide) derivative such as at least one of disuccinimidyl suberate, bis (sulfosuccinimidyl) suberate, and/or N-(Allyloxycarbonyloxy)succinimide.

Examples of physical crosslinkers include various salts such as at least one of an aluminum salt, a calcium salt, an alkaline earth metal salt, and/or a Group III salt. In some embodiments of the present disclosure, a physical crosslinker may include at least one of aluminum chloride, phosphate, sulfate, fluoride, bromide, iodide, nitrate, hydroxide, and other salts that produce the aluminum cation, calcium chloride, phosphate, sulfate, fluoride, bromide, iodide, nitrate, hydroxide, and/or any other salt that produces an aluminum cation. In some embodiments of the present disclosure, a physical crosslinker may include a salt that includes at least one of beryllium, magnesium, strontium, barium, radium chloride, boron, gallium, indium, and/or thallium chloride.

In some embodiments of the present disclosure a hygroscopic agent 130 may include at least one of an organic hygroscopic agent and/or an inorganic hygroscopic agent. In some embodiments of the present disclosure, a physical crosslinker and an organic hygroscopic agent may be substantially the same material. In some embodiments, a physical crosslinker may also serve as an organic hygroscopic agent. In some embodiments of the present disclosure, an organic hygroscopic agent may include at least one of an acetate, a nitrate, and/or a polymer including at least one an acrylate, a sulfonate, a hydroxyl group, a carboxylate, and/or an ammonium cation. In some embodiments of the present disclosure, an organic hygroscopic agent may include at least one of sodium alginate, poly(pyrrole), and/or poly(pyrrole) doped with an inorganic ion, such as chloride, bromide, sulfate, sulfonate, hydroxide, and/or phosphate. In some embodiments of the present disclosure, an organic hygroscopic agent may include at least one of potassium acetate, sodium acetate, ammonium nitrate, poly(sodium acrylate), poly(styrene sulfonates), a modified cellulose compounds (e.g. cellulose sulfonate), a poly(vinyl alcohol), a polyamide, and/or a polymer containing an ammonium cation.

In some embodiments of the present disclosure, an inorganic hygroscopic agent may be a salt. Examples of inorganic salt hygroscopic agents include at least one of lithium chloride (LiCl), calcium chloride ($CaCl_2$)), aluminum chloride ($AlCl_3$), sodium chloride (NaCl), sodium nitrate ($NaNO_3$), sodium hydroxide (NaOH), potassium nitrate ($KNO_3$), potassium chloride (KCl), potassium carbonate ($K_2CO_3$), potassium sulfate ($K_2SO_4$), a potassium phosphate, potassium oxide (KOH), magnesium chloride ($MgCl_2$), magnesium nitrate ($Mg(NO_3)_2$), magnesium sulfate ($MgSO_4$), magnesium iodide ($MgI_2$), calcium chloride ($CaCl_2$)), calcium nitrate ($Ca(NO_3)_2$), zinc chloride ($ZnCl_2$), zinc nitrate ($ZnNO_3$), zinc sulfate ($ZnSO_4$), iron chloride ($FeCl_3$), lithium bromide (LiBr), and/or lithium chloride (LiCl).

Figure 3:
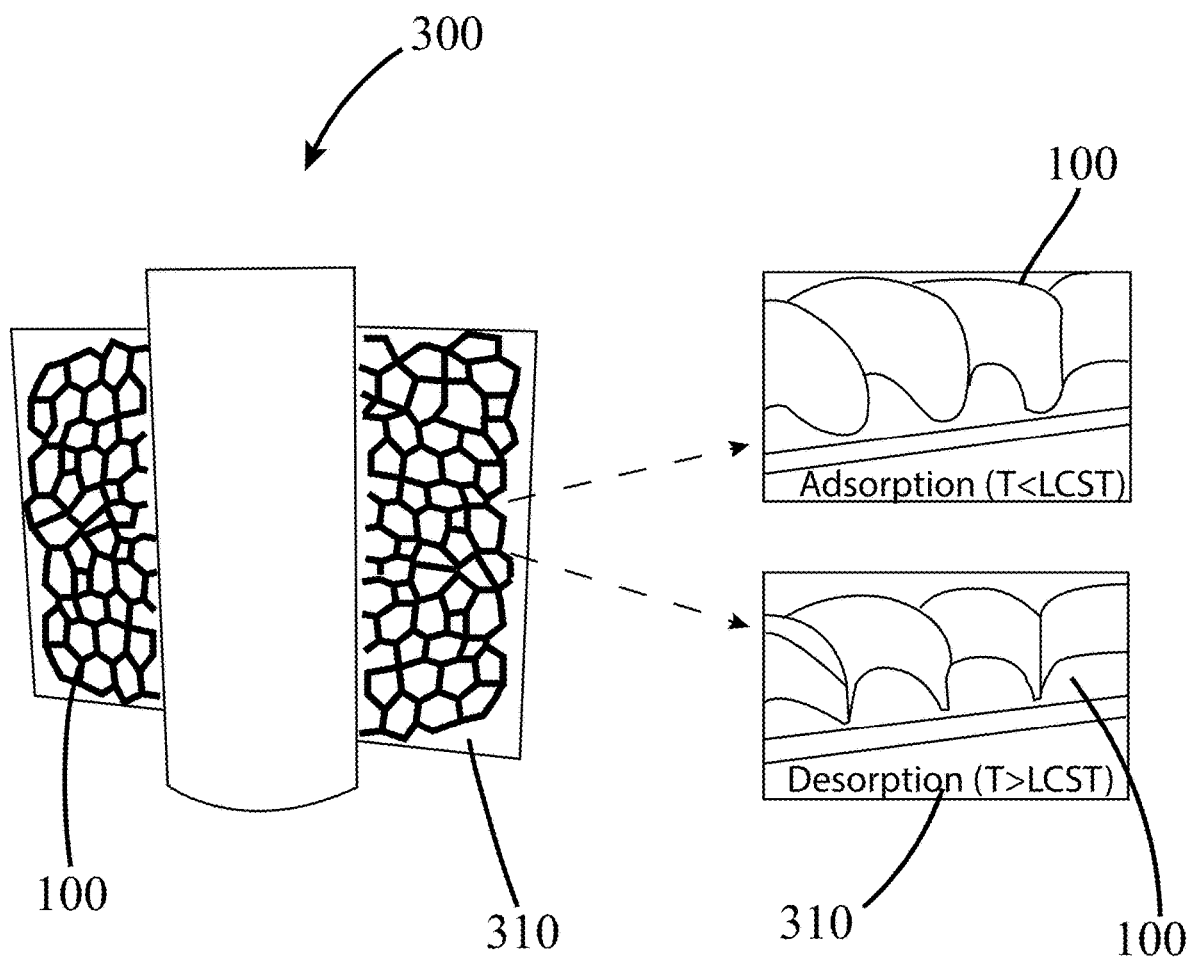
FIG. 3 illustrates a schematic diagram of an adsorption heat exchanger (Ad-HEX) that includes TRHC desiccant incorporated into a thermally conductive metal foam, according to some embodiments of the present disclosure.

In some embodiments of the present disclosure, an LCST desiccant as described herein may be utilized in an adsorption heat exchanger (Ad-HEX) 300, as shown in FIG. 3. For example, an adsorption heat exchanger 300 may include coating a TRHC desiccant 100 into a matrix material 310 as shown in FIG. 3. In some embodiments of the present disclosure, a matrix material 310 may be thermally conductive to maximize the heat transfer rates of adsorption heat exchanger 300. For example, a matrix material 310 may include a metal foam having a substantial pore volume, which may be filled at least partially with the TRHC desiccant 100. In some embodiments of the present disclosure, energy for desorbing the water adsorbed in the TRHC desiccants may be provided by low-grade waste heat. In some embodiments of the present disclosure, an air conditioning system may include an Ad-HEX 300 that incorporates a TRHC desiccant as described herein, resulting in a system having, among other things, enhanced heat and mass transfer performance. In some embodiments of the present disclosure, an Ad-HEX 300 may demonstrate little, if any, delamination of a TRHC desiccant coating positioned on a flat metal surface after 100 cycles, resulting in 100% gel volume expansion and shrinkage during each cycle. In some embodiments of the present disclosure, an Ad-HEX 300 may include a porous TRHC desiccant having a desirable pore size range (e.g., between 100 nm to 1,000) and porosity range (e.g., between 10 vol % and about 70 vol %) and cycling stability of greater than 90% performance retention after 10 cycles.

Figure 4A:
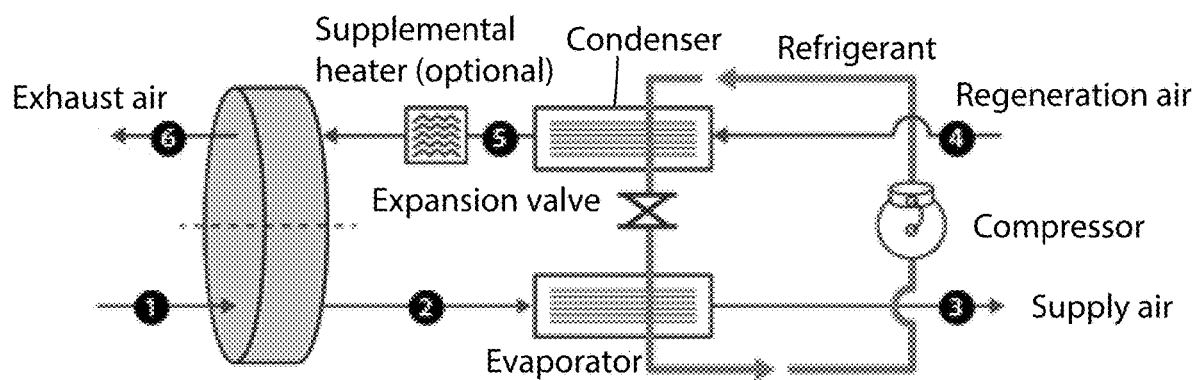
FIG. 4A illustrates a system utilizing separate sensible and latent cooling (SSLC) air conditioning and cooling, according to some embodiments of the present disclosure.
Figure 4B:
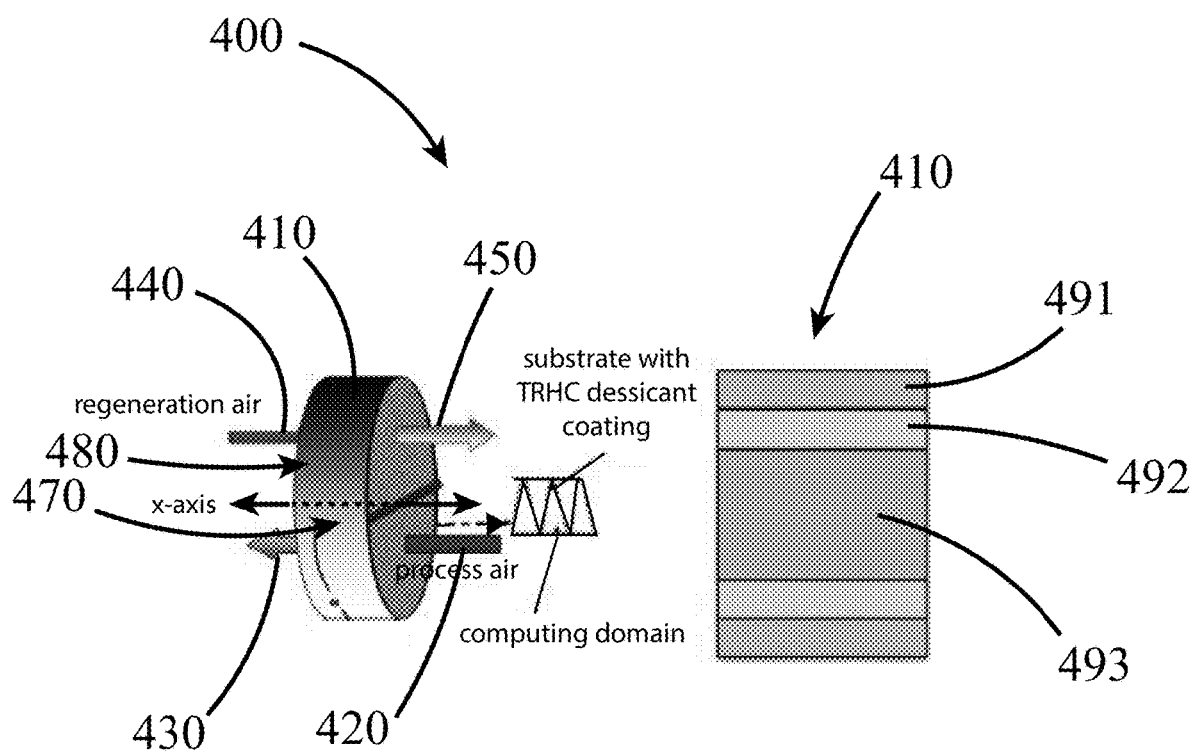
FIG. 4B illustrates a desiccant wheel and a channel cross-section with a control volume for modeling, according to some embodiments of the present disclosure.

In some embodiments of the present disclosure, an air conditioning system may include a TRHC desiccant positioned on and/or in a rotating wheel, which may be combined with at least one of a VCRS and/or an evaporative cooler to form a hybrid separate sensible and latent cooling (SSLC) air conditioning system (see FIGS. 4A and 4B). In some embodiments of the present disclosure, a desiccant-containing, rotating wheel may efficiently remove moisture from the air (latent load) while the VCRS or evaporative cooler may reduce the air temperature (sensible load), or vice versa. Such a SSLC arrangement may eliminate the requirement that an air conditioning system be operating below the dew point temperature of the supply air, which includes use of a cooling coil and subsequent reheating. The low $T_{reg}$ and low energy requirement of TRHC desiccants described herein may enable the use of condenser heat or low-grade building waste heat, which may improve system efficiency and/or reduce system complexity compared to current SDAC systems. FIG. 4A illustrates a schematic of hybrid SSLC air conditioning system, according to some embodiments of the present disclosure. The air conditioning system may circulate a refrigerant through a condenser, expansion valve, evaporator, and a compressor. The supply air is the air to be pulled in from the ambient (i.e., external to the building) and cooled and dehumidified using the TRHC desiccant (i.e., water from the supply air is absorbed by the TRHC desiccant when the TRHC desiccant is below the LCST). The regeneration air may be warm air from the interior of the building (which may further be heated by a supplemental heater) to heat the TRHC desiccant above the LCST, resulting in the absorbed water being desorbed. This may be said to "regenerate" the TRHC desiccant (i.e., cause it to desorb previously absorbed water to prepare for future additional absorption).

FIG. 4B provides more details of an air conditioning system 400 that includes a rotating container 410 (e.g., a rotating wheel), according to some embodiments of the present disclosure. Referring to the left panel of FIG. 4B, a rotating container 410 may be in the form of a rotating container 410 for a TRHC desiccant 100 for contacting the TRHC desiccant 100 with a water-containing gas inlet 420 stream to produce a dehumidified conditioned gas outlet stream 430. In some embodiments of the present disclosure, a rotating container 410 may have a circular shape, i.e. the shape of a wheel, although other shapes fall within the scope of the present disclosure. This may be accomplished by positioning a first portion of the TRHC desiccant 100 in a water adsorbing zone 470 of the container 410 that enables contacting the gas inlet stream 420 with the TRHC desiccant 100, resulting in the removal of water vapor from the gas inlet stream 420 to produce the dehumidified gas outlet stream 430. Once the TRHC desiccant has adsorbed sufficient moisture, e.g. at or close to its AdC, the container 410 may be rotated around a central axis, x-axis, resulting in the movement of the first portion of TRHC desiccant 100 out of the water adsorbing zone 470 into a water desorbing zone 480. Once in the water desorbing zone 470, the water-containing TRHC desiccant 100 may be contacted with a regeneration gas inlet stream 440 that provides the energy needed to heat the TRHC desiccant to its LCST resulting in the removal of the adsorbed water from the TRHC desiccant 100, such that it can be rotated back into the water adsorbing zone 470 to repeat the cycle. Referring again to FIG. 4B, once the regeneration gas has provided the energy needed to desorb the water from the TRHC desiccant 100, it may exit the container 410 as a slightly cooler but humid regeneration gas outlet stream 450. The liquid water may then be removed from the container 410 as a water outlet stream 490 (not shown).

Referring again to the right panel of FIG. 4B, in the example shown, the container 410 is rotated and the gas streams are fixed in position. In some embodiments of the present invention, the container 410 may be maintained in a fixed position, i.e. does not rotate, and the various gas streams (e.g. 420-450) may be moved to different locations around the container 410, as needed.

Referring to the right panel of FIG. 4B, a rotating container 410 may be constructed of an outer supporting wall 491 structure, where the wall 490 forms an internal surface bounding an internal space forming one or more channels. In some embodiments of the present disclosure, a TRHC desiccant 100 may be applied to at least a portion of the internal surface, forming a layer 492 of the TRHC desiccant. In some embodiments of the present disclosure this TRHC desiccant layer 492 may be incorporated into a matrix material 310 that is positioned on the internal surface of the wall 491. At least a portion of the internal space may be configured for the gas streams directed to the container 410. This is space is referred to herein as a volume for gas flow 493.

Thus, a wheel (i.e. container 410) may constantly rotate through two separate gas streams—a gas inlet stream 420 which is dried by the TRHC desiccant 100, and a hot regeneration gas inlet stream 440, which regenerates the desiccant. In some embodiments of the present disclosure, a desiccant-coated rotating wheel (i.e., container 410) may stand alone for energy-efficient dehumidification in industrial and/or commercial buildings. In some embodiments of the present disclosure, a desiccant-coated rotating wheel (i.e. container 410) may be combined with other cooling systems to form a hybrid SSLC A/C system. As described herein, a desiccant wheel (i.e., container 410) may efficiently remove moisture from the air (latent load), while the cooling system reduces the air temperature (sensible load). This arrangement can eliminate the low dew point temperature requirement of the cooling coil and subsequent reheating in VCRS systems.

In some embodiments of the present disclosure, to promote the heat transfer rate, a desiccant wheel (i.e. container 410) may be 3D printed using a thermally conductive filament with high effective thermal conductivity. TRHC desiccants 100 may be synthesized and coated onto the 3D-printed desiccant wheel via chemical bonding by anchoring organic functional group onto the surface of desiccant structure or thin film paste. In some examples, the container 410 surface will be first oxidized and then modified and/or further derived to generate an anchored long-chain polymer network. Such a network can form strong bonds with the TRHC desiccant, which may be confirmed by peeling tests. Other suitable chemistry may be used to anchor a TRHC desiccant to a surface with examples including the use of dopamine-functionalized polymers and/or the combination of gold with thiol functional groups. These methods for anchoring a TRHC desiccant to a surface are provided for illustrative purposes and other chemistries fall within the scope of the present disclosure.

In some embodiments of the present disclosure, a desiccant-containing, a rotating wheel (i.e., container 410) may be operated at different spin speeds (e.g., rotations per minute (RPM)), which may alter the efficiency of liquid removal of adsorbed moisture from a TRHC desiccant. In some embodiments of the present disclosure, ultrasonic vibrations may be utilized to avoid evaporation and remove the water in liquid phase, minimizing the energy associated with the enthalpy of vaporization. The actual percentage of liquid removal may determine the improvement of the COP of dehumidification and SSLC air conditioning systems. For example, utilizing a TRHC desiccant in a desiccant wheel as shown in FIGS. 4A-B, the COP of SSLC air conditioning systems may be improved by up to five times compared with traditional SOA SDAC systems by achieving up to 90% water removal achieved during regeneration cycles, because this eliminates 90% of the energy associated with enthalpy of vaporization.

In some embodiments of the present disclosure, utilizing a TRHC desiccant in a desiccant wheel as shown in FIGS. 4A-B may provide high performance characteristics under extremely humid conditions and the potential to use approximately 50-80% less energy than traditional VCRS by removal of the adsorbed moisture (between about 50 wt % and about 90 wt %) in liquid form. The TRHC desiccants described herein may also be used for industrial dehumidification because they are less corrosive than liquid desiccants.

Figure 5:
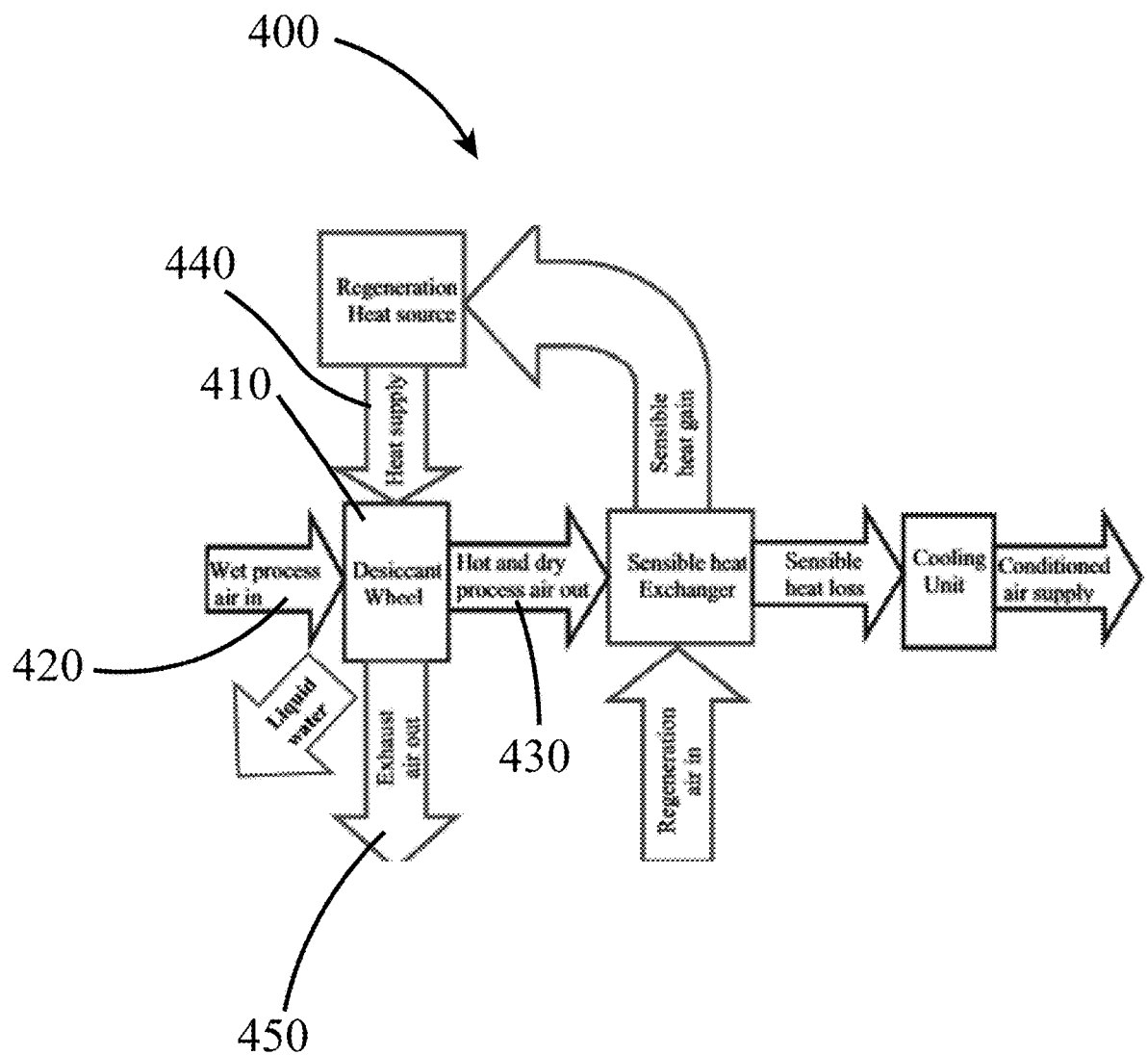
FIG. 5 illustrates a process flow diagram for an air conditioning system utilizing a desiccant wheel, according to some embodiments of the present disclosure.

FIG. 5 illustrates a flow diagram of an air conditioning system 400, showing both the flow of mass and energy, according to some embodiments of the present disclosure. In some embodiments of the present disclosure, a system 400 described herein may have a smaller unit size due to higher AdC and lower energy-costs for regeneration, compared to incumbent technologies. A comparable COP of an SSLC air conditioning system with VCRS for all climates, especially humid conditions, may enable the renovation of the current air conditioning market. In some embodiments of the present disclosure, a hybrid SSLC air conditioning system may include a TRHC desiccant-coated rotary wheel (i.e. container 410) and evaporative cooler and/or traditional vapor compression, as shown in FIG. 5. A desiccant wheel may efficiently remove the moisture from the air and a cooler and/or vapor compression air conditioning system may remove only sensible heat. This type of arrangement may remove the need for low evaporator temperatures below the air dewpoint, and subsequently reheating of the air. Additionally, only one-third of the energy used by traditional air conditioning systems may be required, leading to a higher COP.

Figure 6:
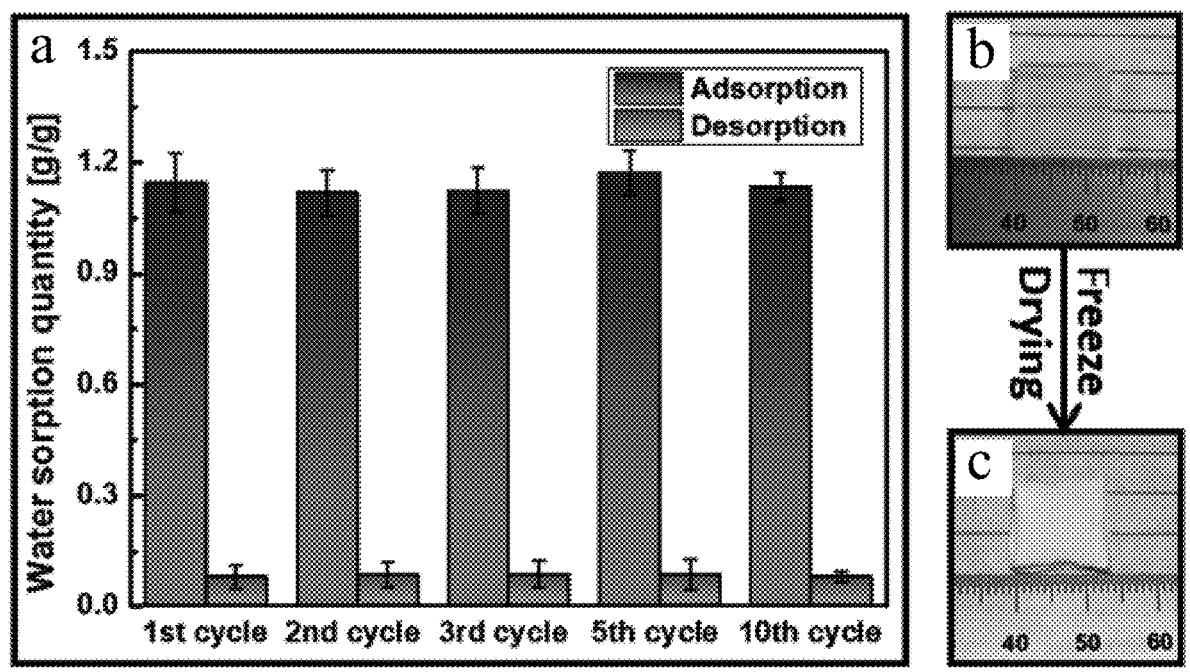
FIG. 6 Panel (a) illustrates adsorption/desorption of TRHC desiccants; Panel (b) illustrates a photo of copolymer; and Panel (c) illustrates a photo of TRHC desiccants, according to some embodiments of the present disclosure.

A further benefit to the embodiments described herein is that all the precursors proposed for at least one synthetic route for manufacturing a TRHC desiccant can be easily obtained from the esterification of acrylic acid with amines/diamines to form thermo-responsive polymers. Initial studies of this TRHC desiccant synthesis showed the TRHC desiccant having a high adsorption capacity of 1.1 g/g (approximately three times higher than that of silica gel) (see Panel (a) of FIG. 6), thereby offering the potential to reduce the size of a hybrid SSLC air conditioning by three times. Moreover, TRHC desiccants can be regenerated by discharging the adsorbed moisture in liquid form at a low temperature of 50° C., which requires only one third of the energy compared to that of silica gel-based systems for significantly improving the COP of hybrid systems (expected to be greater than two).

In addition to removing moisture from the air, a TRHC desiccant may be used for drying solid materials containing liquid water, such as solid sheets (e.g., substantially planar pulps) and films of granular objects (e.g., food products such as dog food or dry cereal). In these examples, the composition may remain the same or additionally include a hygroscopic agent to offer enhanced driving force to absorb liquid water as TRHC desiccants. A hygroscopic agent may include polyelectrolytes (e.g., poly(sodium styrene sulfonate)) or inorganic materials (e.g., lithium chloride, LiCl) and may exhibit a high osmotic pressure.

Figure 7:
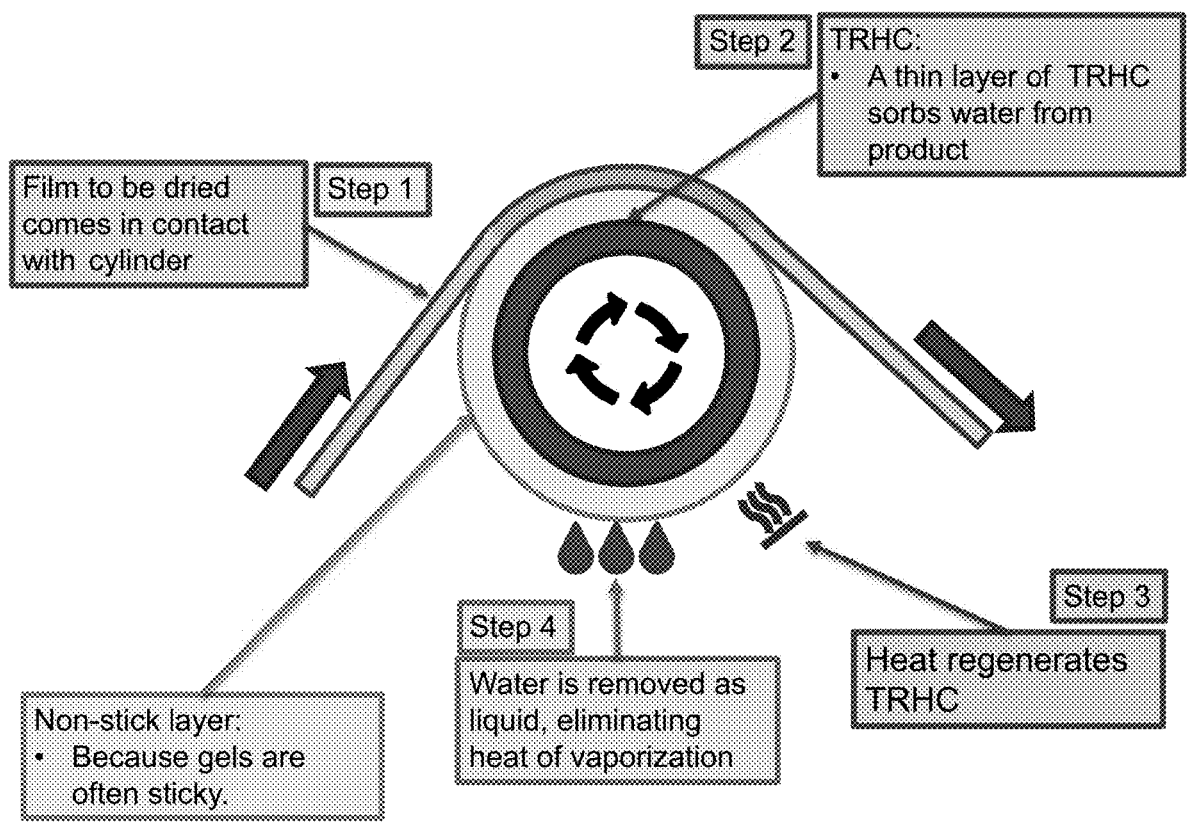
FIG. 7 illustrates a device for drying solid and/or porous films, according to some embodiments of the present disclosure.

FIG. 7 shows an example of how a substantially continuous sheet (e.g., a planar material) could be dried. In step 1, the wet sheet comes in contact with a rotating cylinder that is coated with a TRHC. As the cylinder rotates, water is absorbed from the wet sheet into the TRHC and is released as a dry product in step 2. In step 2, the TRHC has become wet from adsorbing the liquid water and is heated in step 3 to induce the LCST behavior, which releases the water as a liquid in step 4. The TRHC is then exposed to air and new wet material to lower the temperature below the LCST and begin the process again. This process may also include additional cooling (e.g. contact with a heat exchanger or cooled air) between steps 4 and 1 to induce a more rapid LCST phase change. A thin, porous film of non-active material, called the "non-stick layer" is used to prevent tearing/delamination of the TRHC from the cylinder to the product, as the gels may be sticky. The non-stick layer can be made of any material that does not strongly adhere to the product Examples of components of the non-stick layer include polypropylene and/or polyethylene. This system offers an advantage over traditional film-drying techniques, which remove water from solid films by evaporation, as water is removed and released in the liquid phase, thereby avoiding the heat of vaporization for water. Therefore, the energy efficiency of drying can be dramatically improved using this technique. Additionally, the water released by the TRHC may be recovered for other uses.

Figure 8:
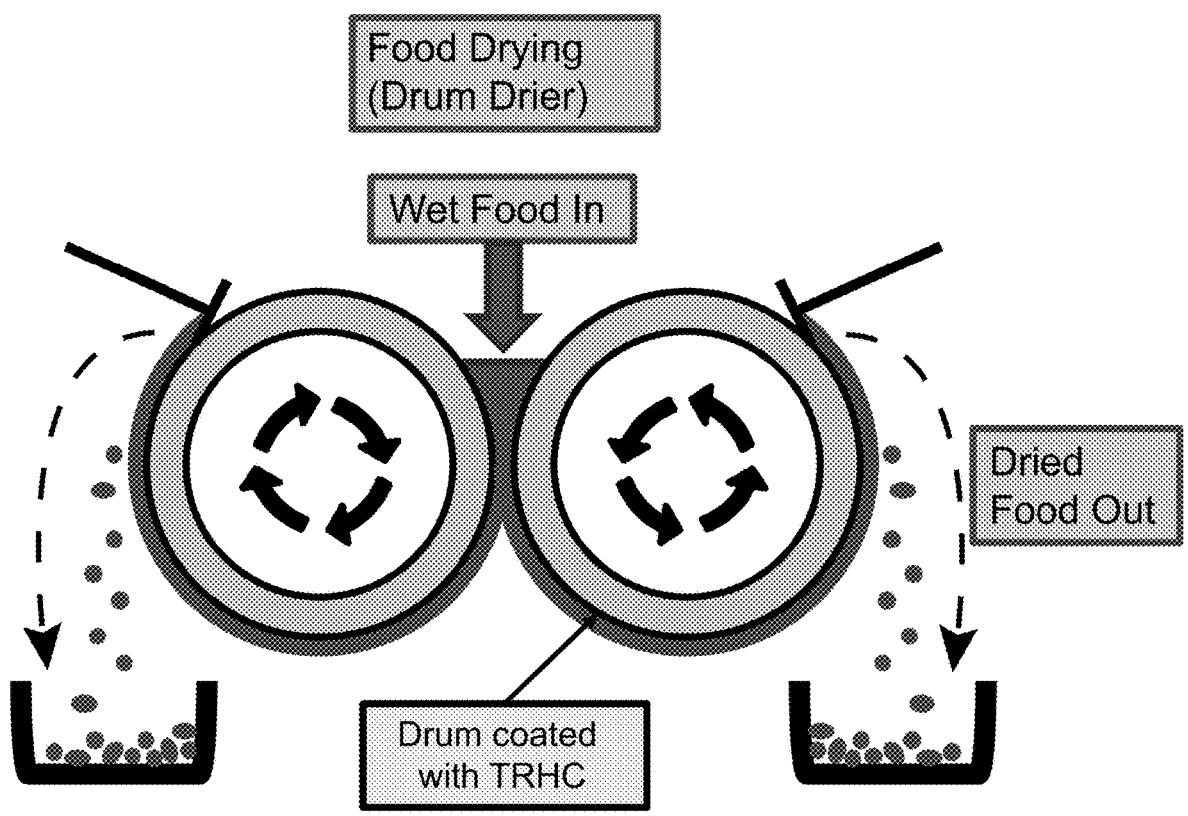
FIG. 8 illustrates a device for drying granular solids, according to some embodiments of the present disclosure.

FIG. 8 shows an example of how granular materials (e.g., food) may be dried using a TRHC, in a similar method to FIG. 7. Wet granular material is first brought into contact with a rotating cylinder (drum drier), which sorbs liquid water from the granular material into the TRHC. While rotating and drying, the granular material will stick to surface of the cylinder through adhesive forces. Near the top of the cylinder, a blade is put into contact with the dried food to physically remove it from the cylinder, where it is collected in a container below the blade or cylinder.

It is important to develop practical methods to facilitate liquid water release from TRHC desiccants having low LCSTs for expansion of applications for this class of materials, specifically in dehumidification and atmospheric water harvesting. In heated air, TRHC desiccants can exhibit contraction and expulsion of water to its surface, but an additional driving force is necessary to overcome the capillarity/cohesion that holds desorbed water within the porous network. Through adequate removal of desorbed water, the moisture content of the TRHC desiccant can be reduced to a point at which a new sorption cycle of humid air can begin. As described herein, centrifugation provides the driving force to separate loosely bound, desorbed water from a TRHC desiccant.

Two methods are described herein to introduce moisture to the TRHC desiccants to test the ability of centrifugation to remove any adsorbed water: (1) immersion in DI water and (2) vapor sorption in an RH controlled environmental chamber. For the immersion method, TRHC desiccants were immersed in deionized water for periods of seconds to hours depending on the water uptake kinetics specific to that TRHC desiccant (dictating factors include porosity and hydrophilicity) and desired moisture content of the TRHC desiccant. When the appropriate moisture content is achieved, the TRHC desiccants were removed from the water where excess surface moisture was removed by dabbing surfaces with a lint-free Kimwipe™ prior to weighing and subsequent centrifugation.

For the vapor sorption method, the TRHC desiccants were incubated in an environmental chamber at the appropriate relative humidity and temperature. In the experiments described herein, a relative humidity of 95% and temperature of 25° C. was used. Sorption proceeded until the desired moisture content was achieved. In cases of TRHC desiccants that included hygroscopic salts (e.g., calcium chloride CaCl$_2$)), excess condensation may occur outside of the TRHC desiccant and were not considered in the moisture content determination.

A Beckman Coulter Optima XE-90 (the Optima L100XP was used in the 7G series of experiments) ultracentrifuge using an SW-32 rotor capable of a maximum of 32,000 RPM (approximately 175,000 g-force at the extremity) and a minimum of 1,000 RPM (approximately 170 g-force at the extremity) was used to complete the experiments described herein (see Table 1). Temperature controls allowed for ranges of 0° C. to 40° C. and the time of each run could be set from one minute up to 1000 hours. In the experiments detailed here, the range of RPMs explored was 1,000-20,000, temperatures from 10° C.-40° C., and times of 5-30 min. An additional independent control variable was the height of TRHC desiccant placement within the centrifuge tube. The specific conditions that yielded optimum results are discussed below.

TABLE 1

Example of g-force as a function of tube depth at 1000 RPM

| Length down tube (cm) | g-force at 1000 RPM |
| --- | --- |
| 0 | 71.0 |
| 1 | 82.2 |
| 2 | 93.4 |
| 3 | 104.5 |
| 4 | 115.7 |
| 5 | 126.9 |
| 6 | 138.1 |
| 7 | 149.3 |
| 8 | 160.4 |
| 8.9 | 170.5 |

Depending on the hydrated nature of the TRHC desiccant, it may adhere to the plastic centrifuge tube (31 mL Beckman Coulter thick wall polycarbonate tubes, in this case). This allowed the TRHC desiccant to be secured at varying heights within the tube. In this report, if the TRHC desiccants exhibited adhesive properties, placement against the side wall was approximately halfway down the length of the tube. This adhesion is advantageous for (1) keeping the TRHC desiccant separated from the desorbed water that collects at the bottom and (2) reducing the g-force exposure of the TRHC desiccants through proximity to the rotational axis. The approximate g-force that the TRHC desiccants experienced can be calculated by measuring the distance of the TRHC desiccant from the top of the tube and adding the distance to the center of the rotor and using those values in the following equation:

$$g_{force} = 1.118 \times 10^{-5} (L_{rotor} + L_{tube})(RPM)^2$$

where $L_{rotor}$ is the distance (in cm) from the central axis to the top of the tube (6.35 cm for the SW-32 rotor), $L_{tube}$ is the distance from the top of the tube, and RPM is the set rotations per minute. g-force as a function of depth of tube is shown in Table 1. Too high of a rotational speed can shear the TRHC desiccants off the wall, but with low speeds (1000 RPM) all shear failures can be avoided. Placing the TRHC desiccant at the bottom of the tube (or if it falls as a result of overcoming the adhesion forces) can still allow for water release and phase separation if the temperature is above the LCST. There is potential for the TRHC desiccant to resorb some of the expelled water during the deceleration of the centrifuge, so adhesion to the side wall of the centrifuge tube, if possible, is desired.

Figure 9:
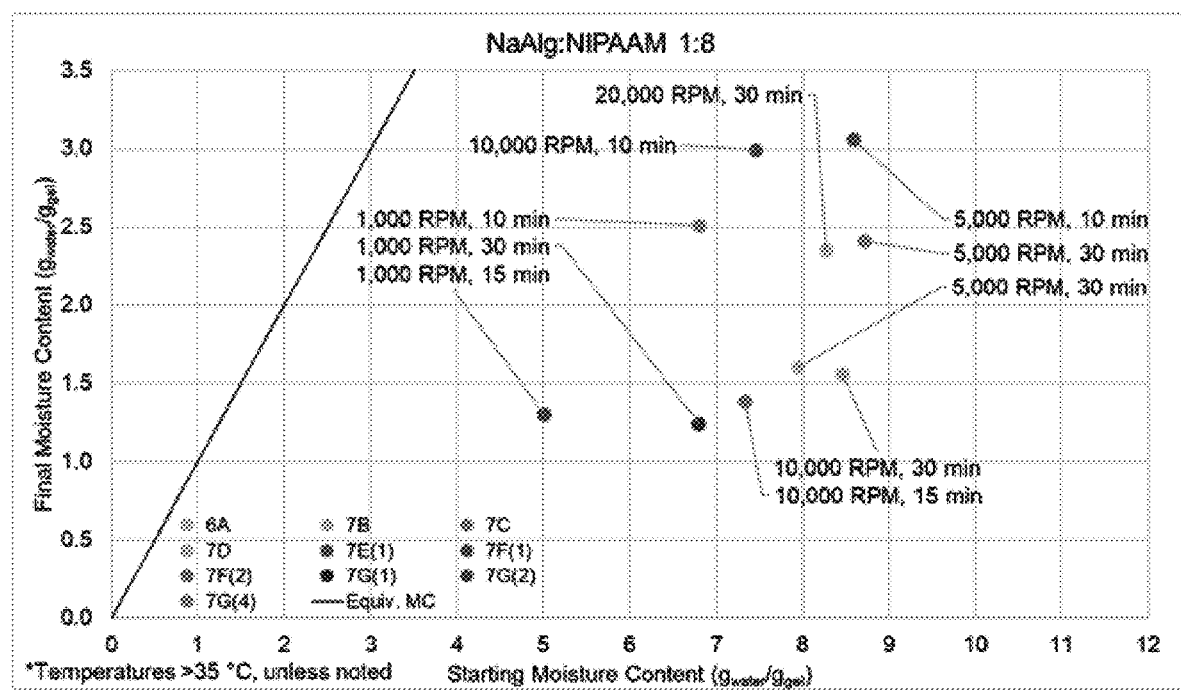
FIG. 9 illustrates starting water content (x-axis) vs. final water content (y-axis) for the TRHC desiccants with a thermo-responsive polymer of NIPAAm and a hygroscopic agent of NaAlginate at an 8:1 weight ratio, according to some embodiments of the present disclosure. Data points are according to RPM used: 20,000 RPM, 10,000 RPM, 5,000 RPM, 1,000 RPM. An equivalent moisture content line that would indicate no change between starting and final moisture content (i.e. y=x) is included for reference.

Initially, higher speeds (in the range of about 5,000 RPM to about 20,000 RPM) were used, but as shown in FIG. 9, this was determined to be unnecessary as the minimum speed of 1,000 RPM proved to provide more than enough force to remove desorbed water from the TRHC desiccants. In an application setting, these lower required forces would directly translate to less energy expenditure to spin out water. Additionally, after determining that TRHC desiccant placement higher up in the tube facilitated separation from desorbed water, rotation speeds above 1,000 RPM caused the TRHC desiccant to shear down the wall of the tube, often causing tearing in the TRHC desiccant. Therefore, speeds of less than about 1,000 RPM were preferred. For example, speeds in the range of about 500 to about 900 RPM may be used.

Temperatures above the anticipated LCST appeared provide good water release. In these experiments, the set point of the centrifuge was primarily approximately 40° C., but heating was slow due to heating only taking place when the chamber was sealed and under vacuum. Often, the most achievable temperature was about 38° C. and an acceptable minimum for starting the centrifuge was chosen to be approximately 35° C. (aside from experiments where a lower temperature was the goal). These temperatures were acceptable for water release in these experiments. In one experiment, sample 7A was spun at about 20,000 RPM at about 21° C. for about 30 min (the most aggressive conditions used) and spread out to cover the bottom of the tube with no water release, indicating that higher temperatures were required. With a sample containing $CaCl_2$), and attached to the sidewall, sample 14F(2) (shown in FIG. 10), was spun at 1,000 RPM for about 30 min at about 25.5° C. and actually released water, but had a higher final moisture content than any of the calcium chloride ($CaCl_2$)) containing TRHC desiccants spun at greater than about 35° C. for half the time, indicating that there was still an influence of temperature for these samples.

Time periods between about 5 minutes and about 30 minutes were explored for water release. The primary factor dictating the spin time was hypothesized to be temperature equilibration of the TRHC desiccant and tube to the elevated temperature of the centrifuge chamber to allow for water release. The ambient temperature of the lab was measured to be between about 21° C. and about 22° C. and the centrifuge chamber was primarily set to about 40° C. Time periods of about 5 minutes and about 10 minutes did not appear to allow for adequate equilibration of the TRHC desiccant and there was limited or no water release. In the cases where water was released after about 10 minutes of centrifugation, the moisture content was higher than those centrifuged for between about 15 minutes and about 30 minutes (except for sample 7F(2) in FIG. 9 centrifuged at 10,000 RPM). Durations of 15 minutes were determined to be optimal for good water release at the shortest time.

Figure 11:
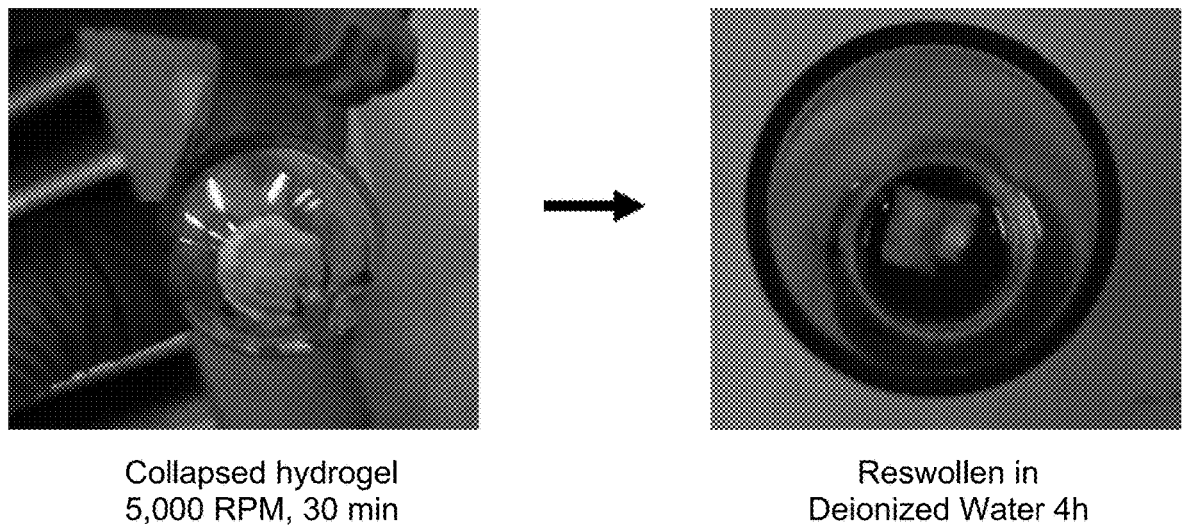
FIG. 11 illustrates centrifuged TRHC desiccants that have a collapsed, opaque structure can be reswollen in water to recover their shape, according to some embodiments of the present disclosure.

Results of water release from samples with a thermo-responsive polymer of poly(N-isopropylacrylamide) and a hygroscopic agent of sodium alginate (NaAlg) in an 8:1 ratio. These TRHC desiccants had moderate sorption times between about 10 minutes to about 60 minutes yielding a moisture content of between about 4 $g_{water}/g_{gel}$ and about 10 $g_{water}/g_{gel}$. This was the primary set where the centrifugation conditions were optimized, as shown by the large number of samples in FIG. 9. These TRHC desiccants were extremely adhesive when swollen and proved difficult to handle without tearing or losing mass to surfaces (e.g., gloves, weigh paper, forceps, centrifuge tube). Increasing transparency and volume expansion with moisture sorption was observed, followed by complete opacity and structural collapse when centrifuged. When placed back into DI water, the collapsed TRHC desiccants could regenerate into their flat, square shapes shown in FIG. 11, indicating the force applied through centrifugation was not enough to cause noticeable damage, at least by this test.

Figure 10:
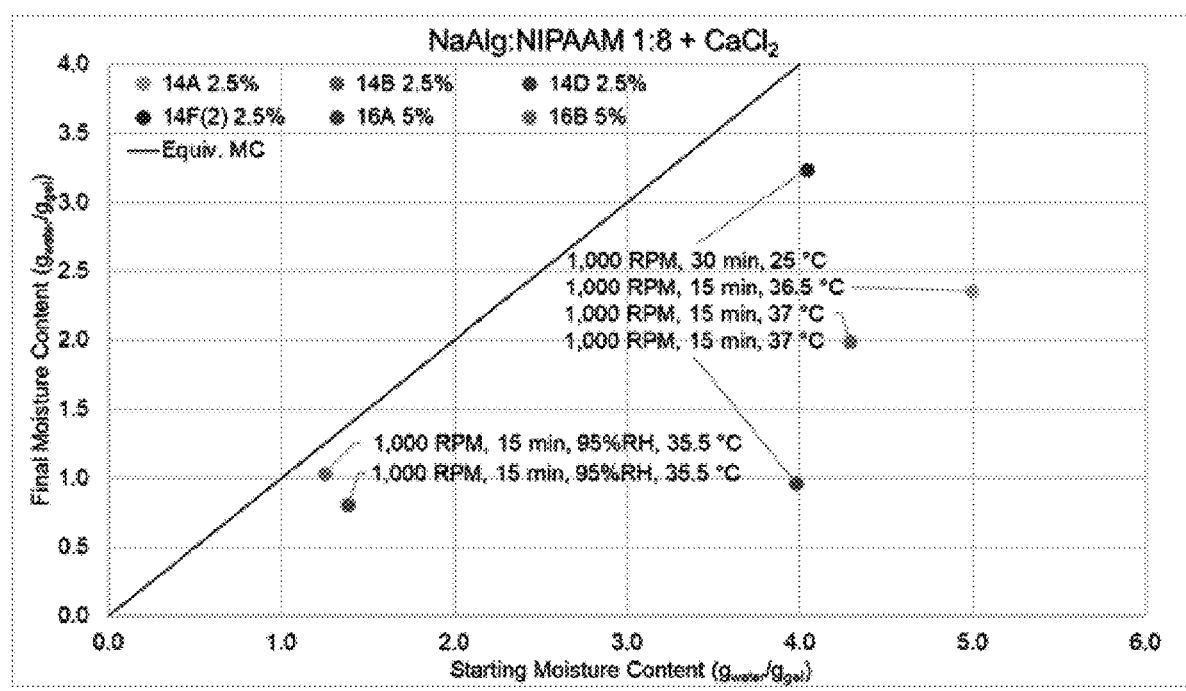
FIG. 10 illustrates starting Moisture content (x-axis) vs. final Moisture content (y-axis) for the TRHC desiccants with a thermo-responsive polymer of NIPAAm and a hygroscopic agent of NaAlginate at an 8:1 weight ratio soaked in $CaCl_2$) solutions of 2.5 wt % or 5 wt %, according to some embodiments of the present disclosure. An equivalent moisture content line that would indicate no change between starting and final moisture content (i.e. y=x) is included for reference.

For samples of a thermo-responsive polymer of NIPAAm and a hygroscopic agent of NaAlg in an 8:1 ratio with a crosslinker of calcium chloride ($CaCl_2$)), these TRHC desiccants had very fast immersion sorption times, often on the order of less than 10 seconds for moisture contents of 4 $g_{water}/g_{gel}$. The precipitated $CaCl_2$ within the porous structure was leached out during the sorption and release phase, resulting in mass reductions of about 30% to about 40% when dried after testing. For moisture content calculations, the final mass had to be used to account for the salt leaching. Among the salt impregnated TRHC desiccants, samples 16A and 16B were the only set of TRHC desiccants that were placed into the environmental chamber at about 25° C. and about 95% RH (as shown in FIG. 10). All others absorbed water from immersion into deionized water. The starting moisture contents for the vapor sorption samples were much lower than the immersion sorption samples as a result of the adsorbed water in the environmental chamber dissolving out the $CaCl_2$) and forming a solution separate from the TRHC desiccant which could not be resorbed. Despite the leaching of the salts, there was still a small amount of water release when centrifuged, lowering the moisture content from about 1.3 $g_{water}/g_{gel}$ to about 0.9 $g_{water}/g_{gel}$.

Figure 12:
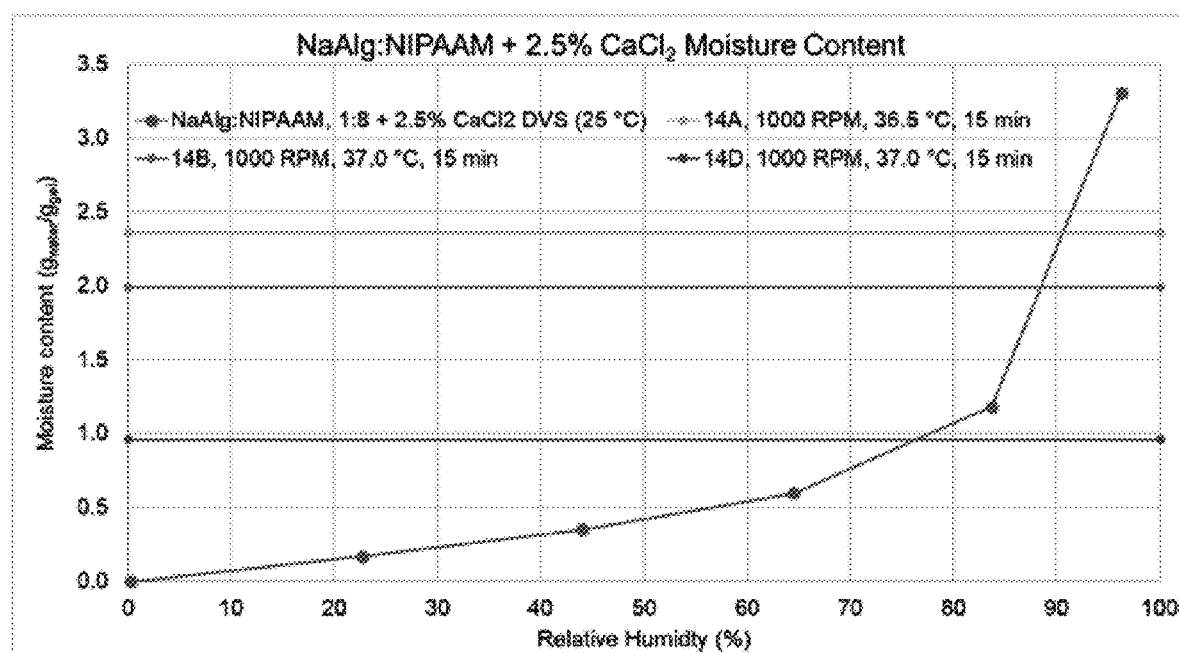
FIG. 12 illustrates dynamic vapor sorption curve at 25° C. and final moisture contents for a TRHC desiccant constructed of a thermo-responsive polymer of NIPAAm and a hygroscopic agent of NaAlginate at an 8:1 weight ratio soaked in 2.5 wt % $CaCl_2$) (i.e., inorganic hygroscopic agent or crosslinker) solutions, according to some embodiments of the present disclosure.
Figure 13:
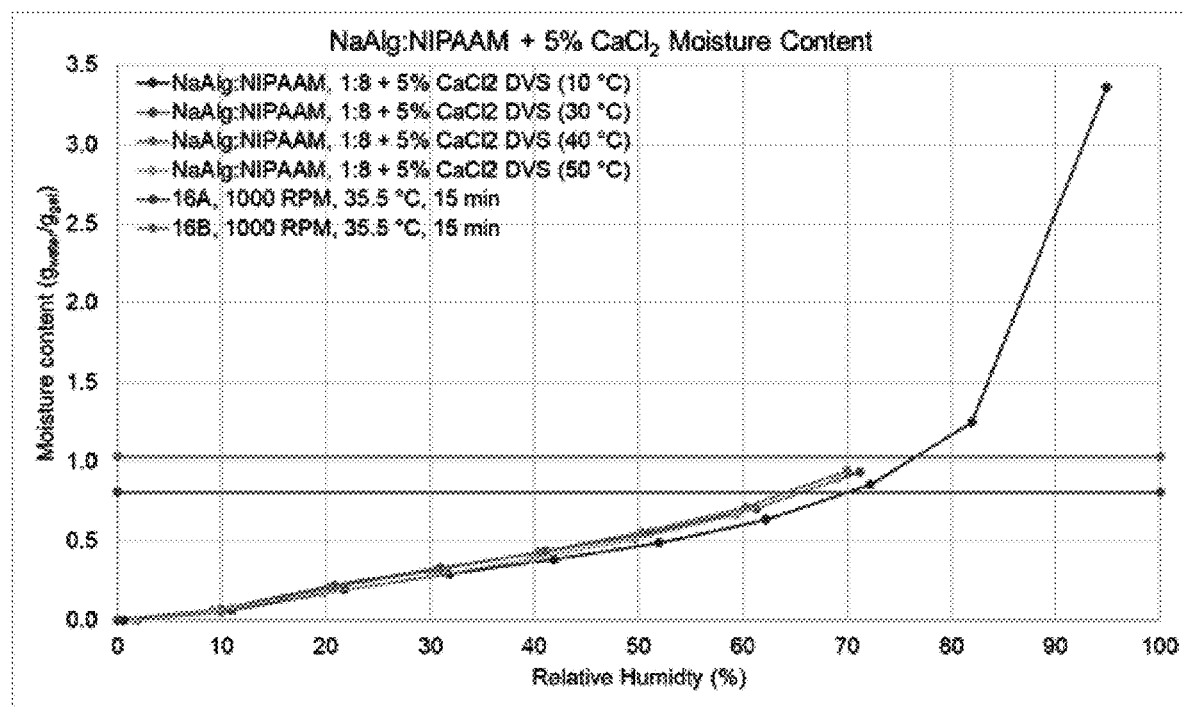
FIG. 13 illustrates dynamic vapor sorption curves at varying temperatures and final moisture contents for the TRHC desiccants having a thermo-responsive polymer of NIPAAm and a hygroscopic agent of NaAlginate at an 8:1 weight ratio soaked in 5 wt % $CaCl_2$) solutions, according to some embodiments of the present disclosure.

In FIG. 12 and FIG. 13, the final moisture contents from the centrifuged 2.5% and 5% TRHC desiccants in solution are plotted as horizontal lines over their respective dynamic vapor sorption curves. This provides information about the range of RH environments where these TRHC desiccants could uptake enough water that could then be released via centrifugation. The 5% TRHC desiccants would require an operating environment of at least 80% RH at room temperature to absorb enough moisture to release it as liquid water. For the 2.5% TRHC desiccants, that operating RH is even higher. The high threshold for vapor sorption, coupled with the $CaCl_2$) leaching restricts both applicability and cyclability in the context of a desiccant wheel.

Figure 14:
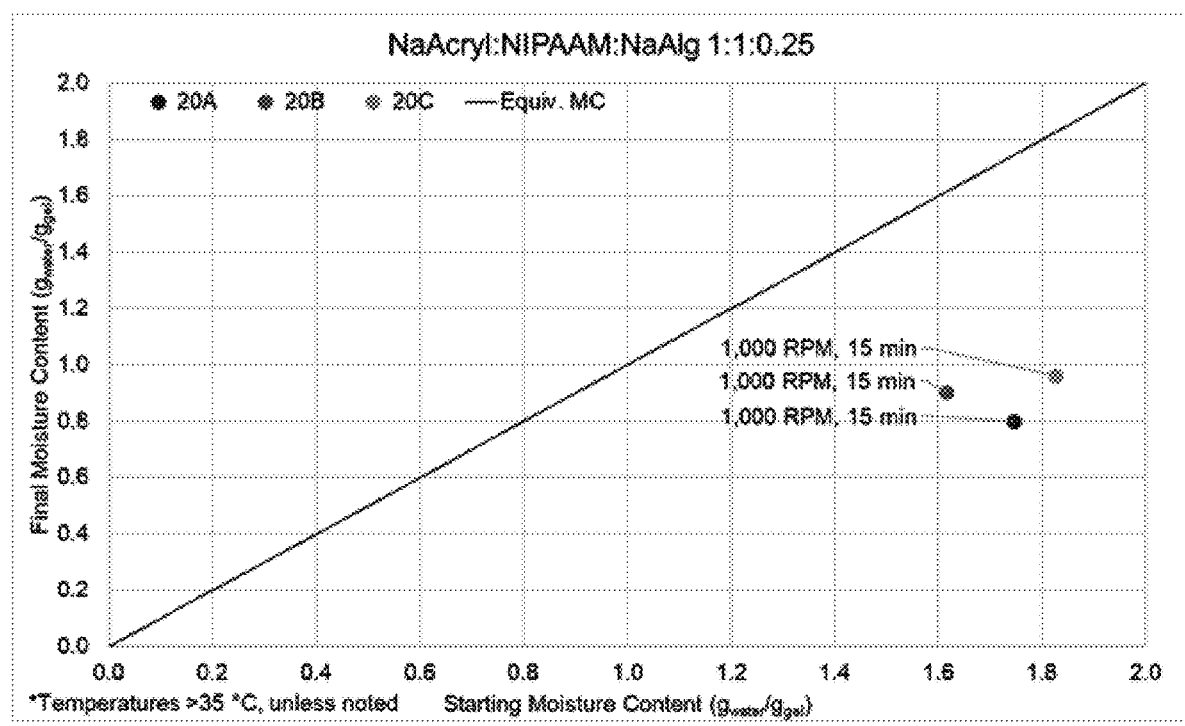
FIG. 14 illustrates starting moisture content (x-axis) vs. final moisture content (y-axis) for a TRHC desiccant constructed of a thermo-responsive polymer of NIPAAm, a hygroscopic agent of NaAcrylate, and a hygroscopic agent of NaAlginate at a weight ratio of 1:1:0.25, according to some embodiments of the present disclosure. An equivalent moisture content line that would indicate no change between starting and final moisture content (i.e. y=x) is included for reference
Figure 15:
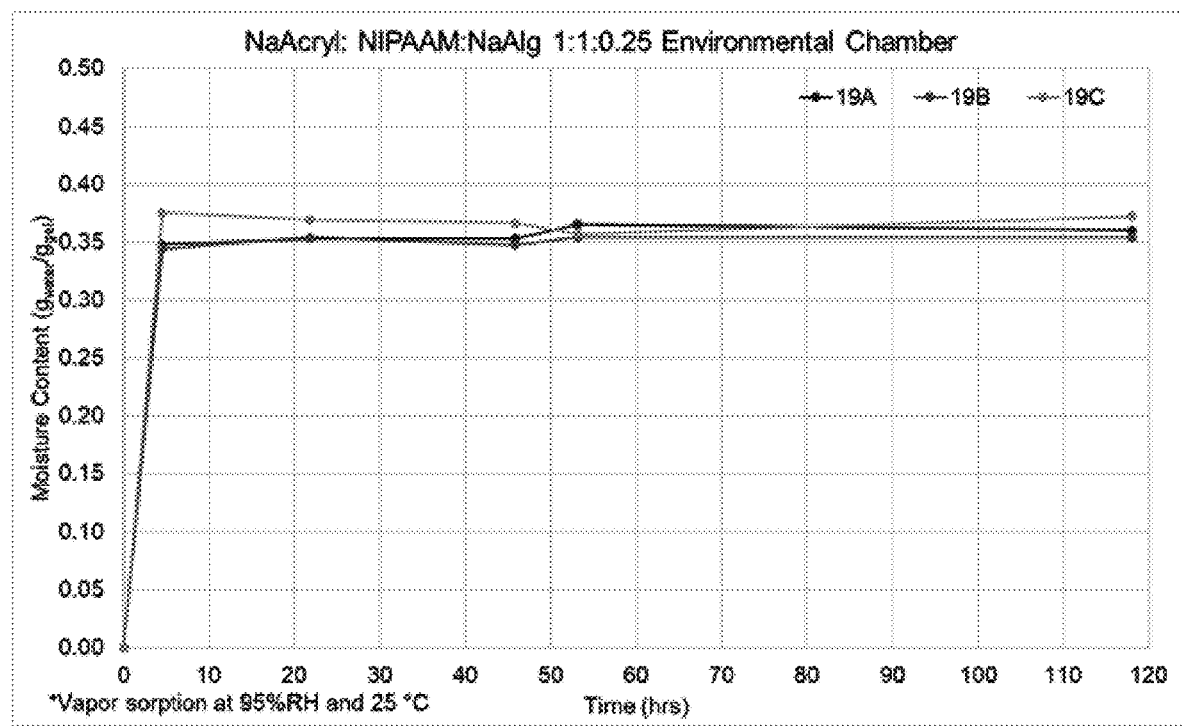
FIG. 15 illustrates vapor sorption of a for a TRHC desiccant constructed of a thermo-responsive polymer of NIPAAm, a hygroscopic agent of NaAcryl, and a hygroscopic agent of NaAlg desiccant in the environmental chamber at 95% relative humidity (RH) and 25° C., according to some embodiments of the present disclosure.

For examples of a thermo-responsive polymer of NIPAAm, a hygroscopic agent of sodium acrylate (NaAcryl) and a crosslinker of NaAlg in a ratio of 1:1:0.25, this set of TRHC desiccants exhibited very slow immersion sorption times, where after 2 hours of immersion, only a moisture content of about 1.7 $g_{water}/g_{gel}$ was achieved, shown in FIG. 14. This composition of TRHC desiccants appeared to have a higher density, smaller porous structure than the TRHC desiccants without sodium acrylate, which is hypothesized to have restricted sorption kinetics. Even at low starting moisture contents, a portion of the absorbed water could be spun out of the TRHC desiccant using the optimized conditions (1,000 RPM, approximately 38° C., 15 min) to a moisture content between about 0.8 $g_{water}/g_{gel}$ to about 1 $g_{water}/g_{gel}$. When conditioned at about 95% RH and about 25° C. in the environmental chamber, shown in FIG. 15, these TRHC desiccants adsorb less than about 0.4 $g_{water}/g_{gel}$ meaning that they would require an additional hygroscopic component to increase the adsorbed moisture content to a point where they could exhibit liquid water release.

Figure 16:
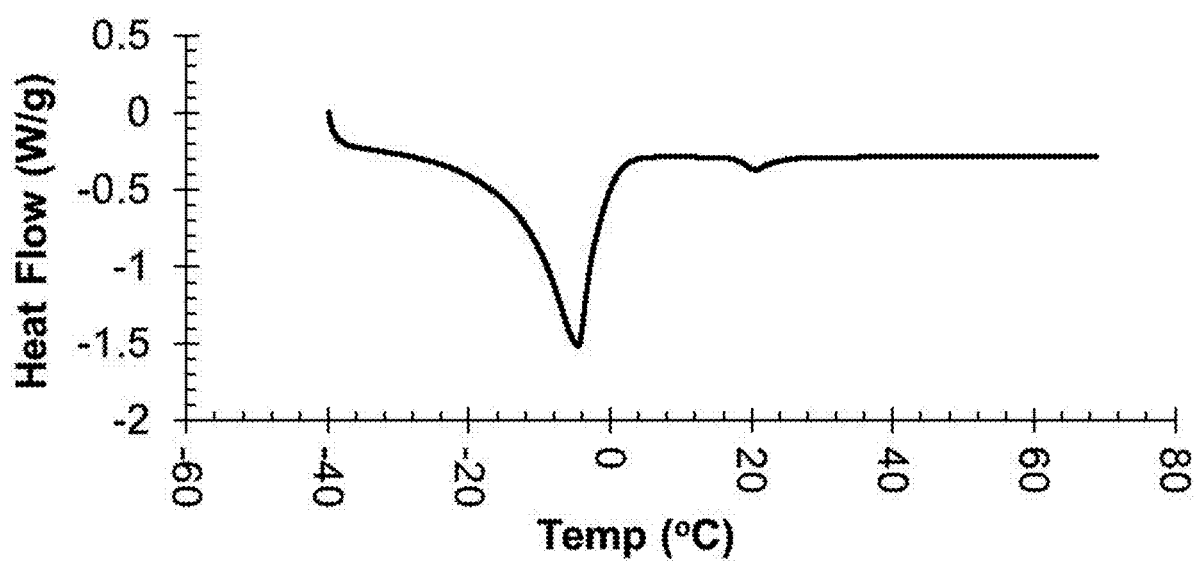
FIG. 16 illustrates a representative differential scanning calorimetry (DSC) trace for a TRHC desiccant constructed of a thermo-responsive component of NIPAAm and a hygroscopic agent of Sodium Alginate in an 8:1 weight ratio in 5% solution, where a negative heat flow represents energy flowing into the TRHC desiccants and the DSC is heating from −40° C. to 70° C., according to some aspects of the present disclosure.
Figure 17:
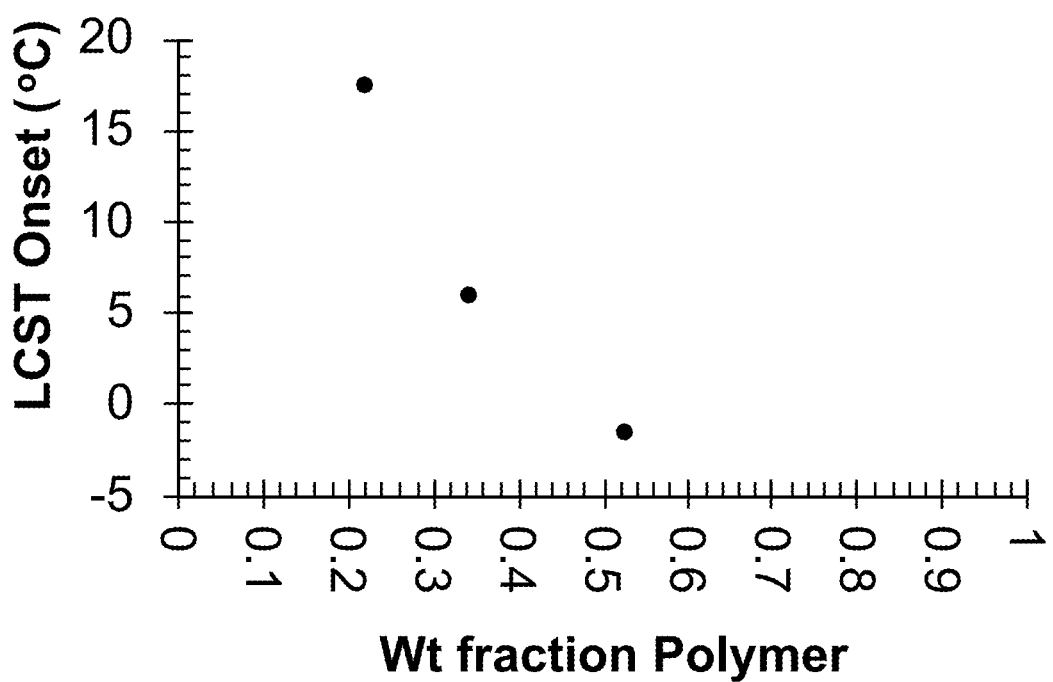
FIG. 17 illustrates the onset and peak of the transition temperature for a TRHC desiccant constructed of a thermo-responsive component of NIPAAm and a hygroscopic agent of Sodium Alginate in an 8:1 weight ratio in 5% solution, according to some aspects of the present disclosure.
Figure 18:
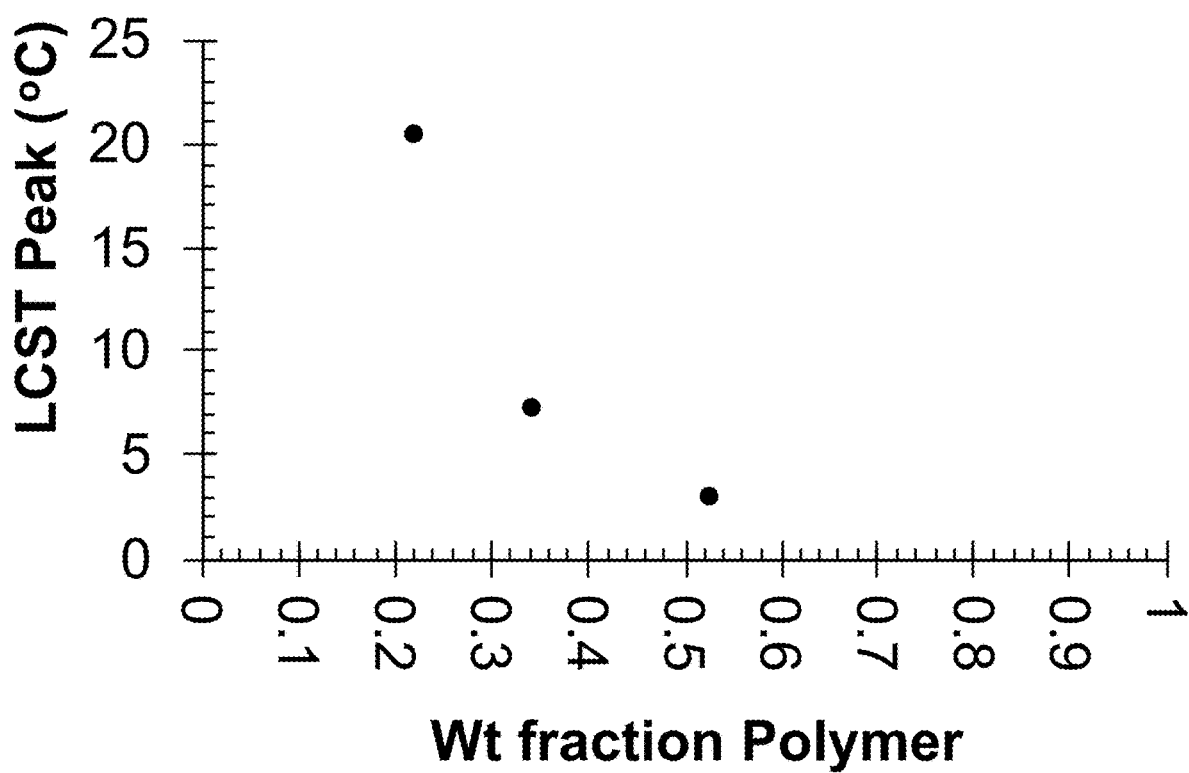
FIG. 18 illustrates the onset and peak of the transition temperature for a TRHC desiccant constructed of a thermo-responsive component of NIPAAm and a hygroscopic agent of Sodium Alginate in an 8:1 weight ratio in 5% solution, according to some aspects of the present disclosure.

FIGS. 16-19 illustrate differential scanning calorimetry (DSC) data for TRHC desiccants constructed of a thermo-responsive polymer of NIPAAm and a hygroscopic agent of NaAlg in an 8:1 ratio in a 5% solution, according to some embodiments of the present disclosure. A DSC measures the heat input required to cause a change in temperature, therefore endothermic and exothermic transitions can be measured. FIG. 16 illustrates a representative DSC trace for these samples, where a negative heat flow represents energy flowing into the sample and the DSC is heating from about −40° C. to about 70° C. From this trace, the melting of water can be seen at approximately about −5° C. and the LCST transition can be seen at approximately 20° C. Because these samples contain $CaCl_2$), the LCST transition is suppressed from the normal about 32° C. due to the Hofmeister effect.

Figure 19:
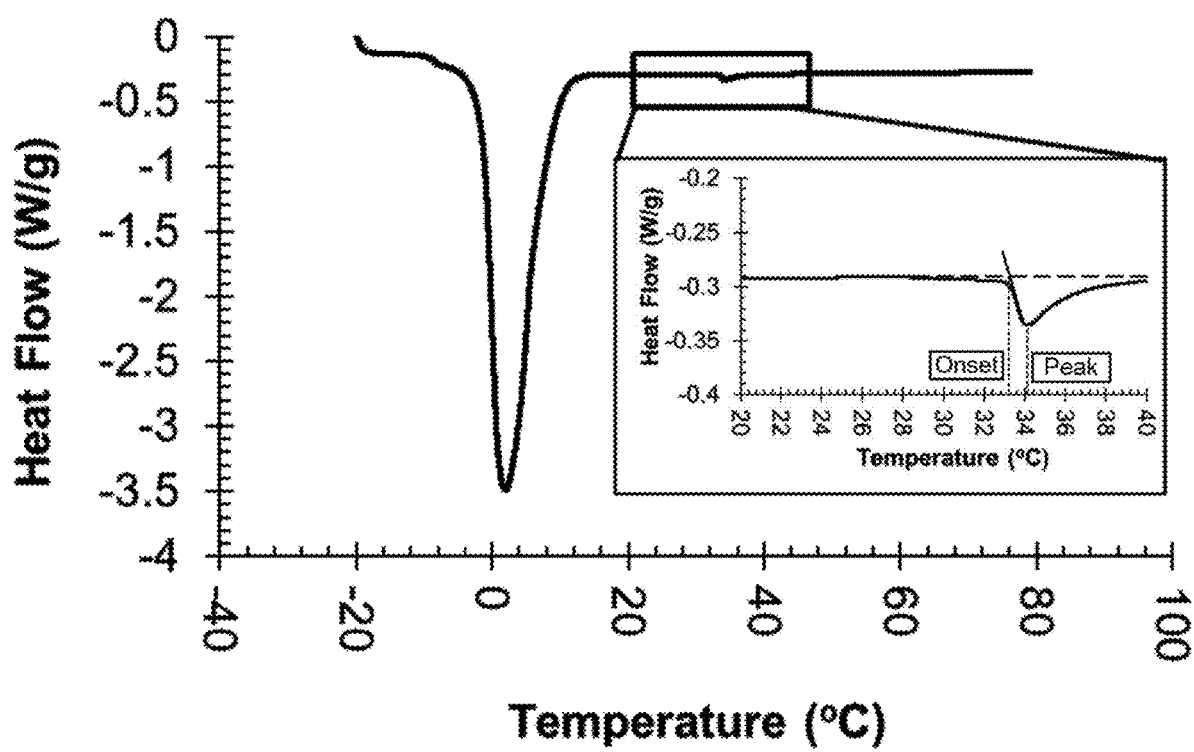
FIG. 19 illustrates the heat flow through the LCST transition for a TRHC desiccant constructed of a thermo-responsive component of NIPAAm and a hygroscopic agent of Sodium Alginate in an 8:1 weight ratio in 5% solution, according to some aspects of the present disclosure.

As with most PNIPAM samples, the LCST transition also depends on the concentration of polymer, or, in other words, the LCST is dependent on the water content of the gel. This phenomenon can be seen in FIGS. 17 and 18, where the same gel's onset and peak of the transition temperature were respectively measured at different water uptakes. The onset temperature is measured as the intercept of the maximum of the slope of the peak and the baseline determined by the non-peak region. The peak temperature is simply the maximum of the magnitude of the peak (in this case, the minimum of the peak). For contrast, a PNIPAM control gel that is about 90% water is shown in FIG. 19, exhibiting the traditional approximately 32° C. transition temperature. The freezing of water can be seen by a large peak at approximately 0° C. and the inset highlights the LCST transition at approximately 32° C.

Figure 20:
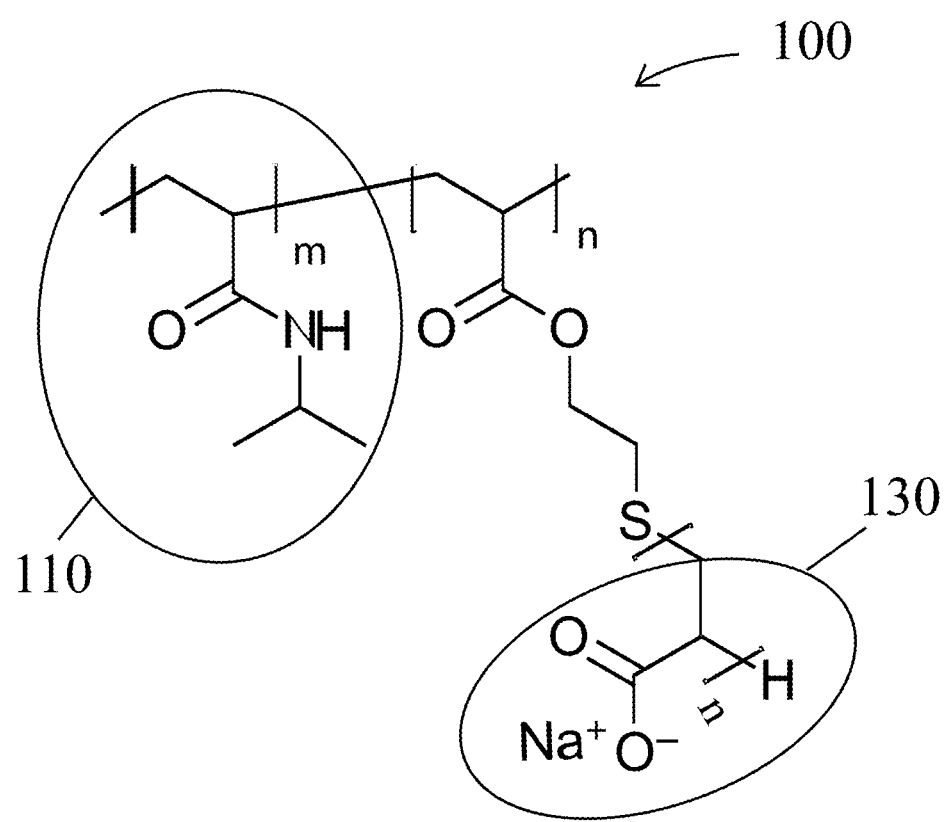
FIG. 20 illustrates the chemical structure of an exemplary grafted copolymer TRHC, according to some aspects of the present disclosure.

FIG. 20 illustrates the chemical structure of an exemplary grated copolymer TRHC 100, according to some aspects of the present disclosure. In FIG. 20, the thermo-responsive polymer 110 is PNIPAM and the hygroscopic agent 130 is poly(sodium acrylate) (PSA). The TRHC 100 may be referred to as PNIPAM-g-PSA (i.e., PNIPAM grafted to PSA). For a grafted polymer structure of a TRHC, there may be primary backbone of the thermo-responsive polymer 110 and side chains of the hygroscopic agent 130 may extend of that primary backbone. The side chains may be covalently bonded to the primary backbone. A grafted copolymer TRHC may also be referred to as a graft polymer TRHC.

Figure 21:
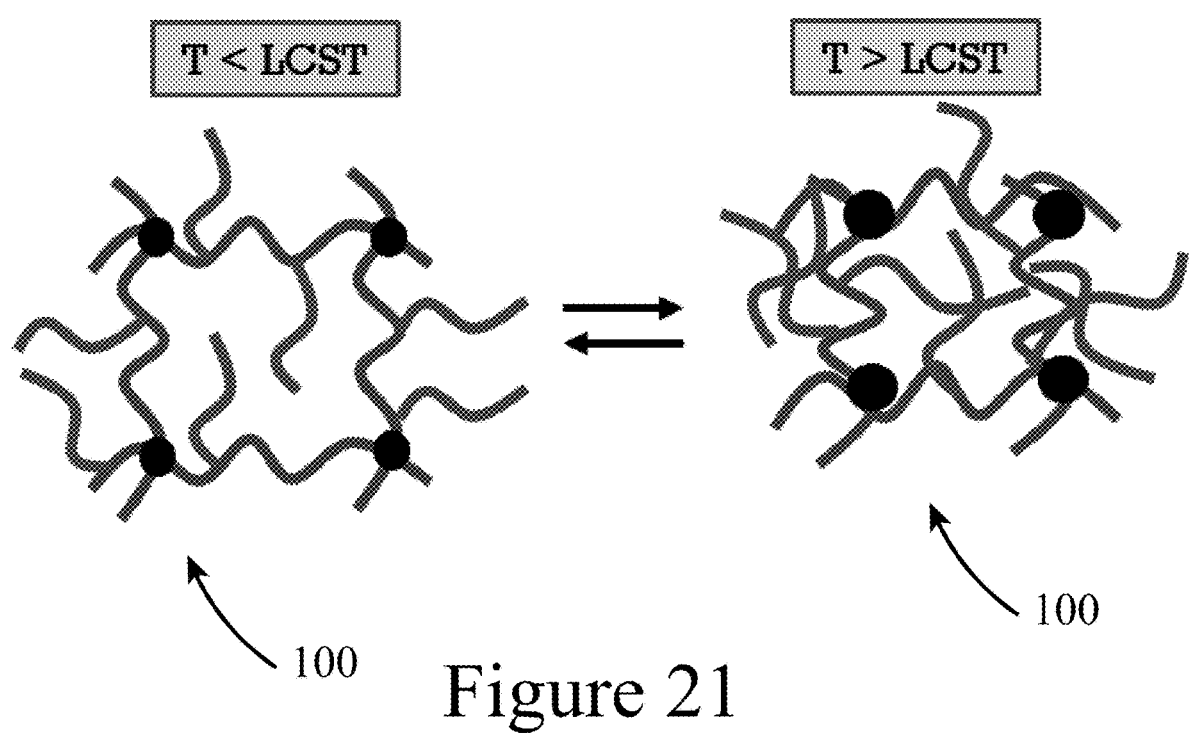
FIG. 21 illustrates the performance of a grafted copolymer TRHC at a temperature greater than the lower critical solution temperature (LCST) and above the LCST, according to some aspects of the present disclosure.

FIG. 21 illustrates the performance of a grafted copolymer TRHC k at a temperature greater than the lower critical solution temperature (LCST) and above the LCST, according to some aspects of the present disclosure. As shown in FIG. 21, when the temperature surrounding the grafted copolymer TRHC 100 is below the LCST (left), the grafted copolymer TRHC 100 may perform in a substantially hydrophilic way and be capable of absorbing water into the grafted copolymer TRHC 100. The water may be absorbed by filling the empty space within the structure, as shown in FIG. 21. When the temperature surrounding the grafted copolymer TRHC 100 is above the LCST (right), the grafted copolymer TRHC 100 may perform in a substantially hydrophobic way and be capable of desorbing water out of the grafted copolymer TRHC 100. The water may be desorbed by the compressing of the structure, as shown in FIG. 21.

Figure 22:
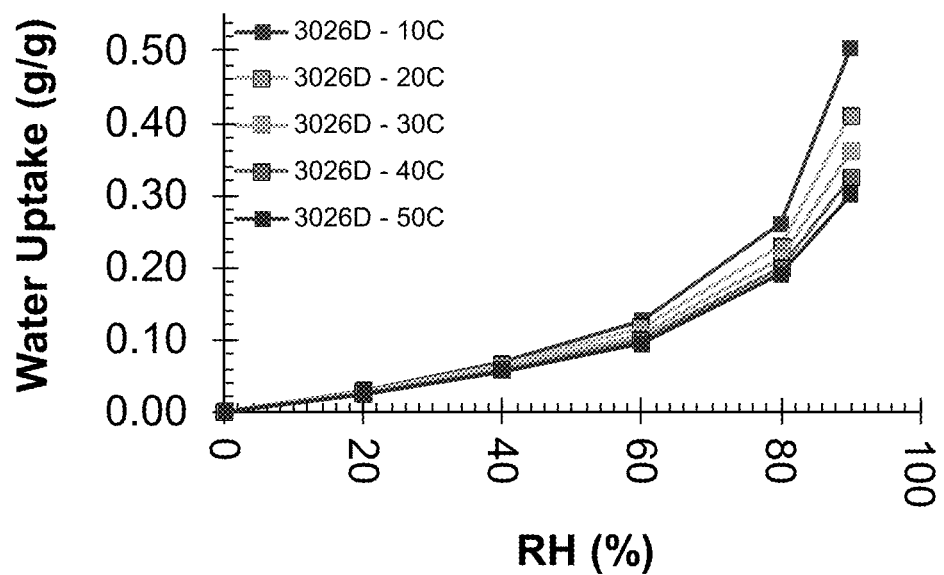
FIG. 22 Panel (a) illustrates the performance of a grafted copolymer TRHC; and Panel (b) illustrates the chemical structure of an exemplary grafted copolymer TRHC in the form of an interpenetrating network, according to some aspects of the present disclosure.
Figure 22:
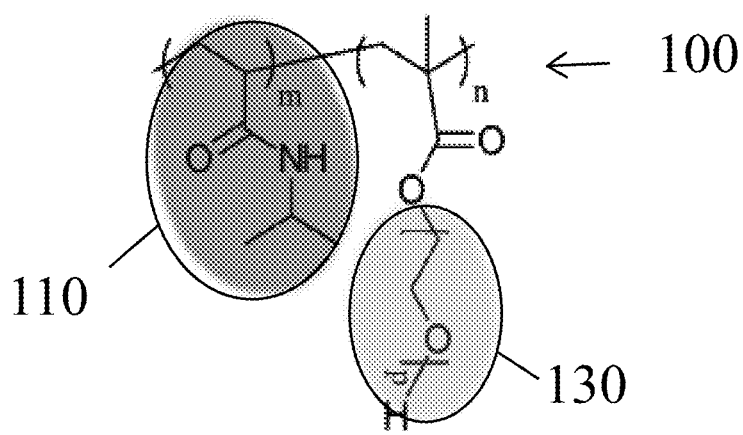

FIG. 22 Panel (a) illustrates the performance of a grafted copolymer TRHC; and Panel (b) illustrates the chemical structure of an exemplary grafted copolymer TRHC, according to some aspects of the present disclosure. In Panel (a) of FIG. 22, the graph shows that the water uptake by the grafted copolymer TRHC 100 increased as the relative humidity increased at every temperature. In Panel (b) of FIG. 22, an exemplary grafted copolymer TRHC 100 is shown. In this example, the thermo-responsive polymer 110 is PNIPAM and the hygroscopic agent 130 is poly (ethylene oxide) (PEO).

Figure 23:
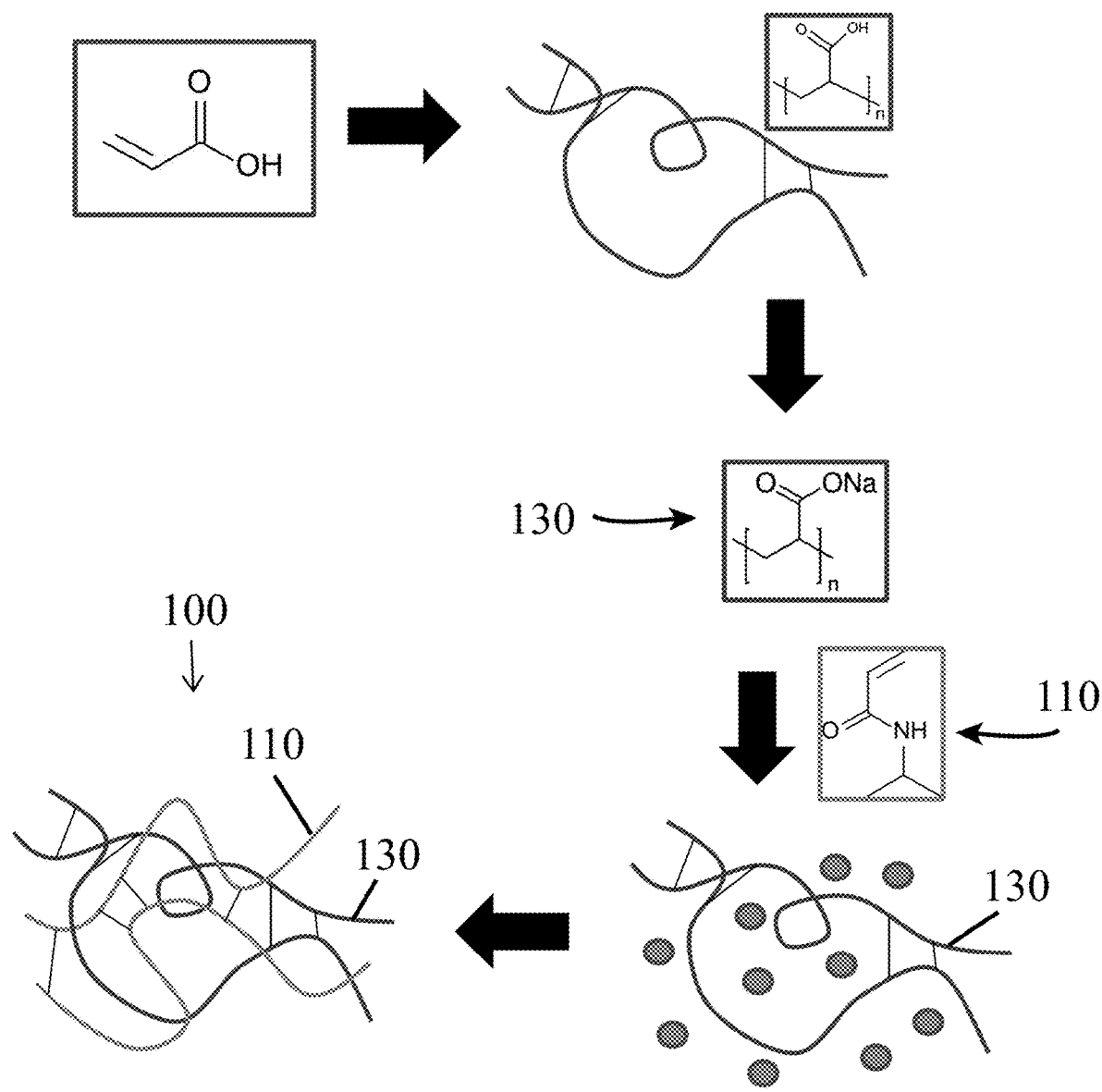
FIG. 23 illustrates a process of making a TRHC in the form of an interpenetrating network, according to some aspects of the present disclosure.

FIG. 23 illustrates a process of making a TRHC in the form of an interpenetrating network, according to some aspects of the present disclosure. First, an initial network of acrylic acid, azobisisobutyronitrile (AIBN) and N,N'-methylenebisacrylamide (MBAA) was created by being heated to about 50° C. and maintained at that temperature for approximately 24 hours. This is then soaked in approximately 0.1 M sodium hydroxide (NaOH) for approximately 24 hours, resulting in the hygroscopic agent 130 (PSA in this example). Next, PSA may be soaked in at least one of NIPAM, ammonium persulfate (APS), or MBAA to form the thermo-responsive polymer 110. To have the thermo-responsive polymer 110 and hygroscopic agent 130 intertwine (i.e., chemically crosslink), they may be heated to approximately 50° C. for approximately 24 hours. This results in the thermo-responsive polymer 110 and the hygroscopic agent 130 being intertwined by not actually chemically bonded together.

Figure 24:
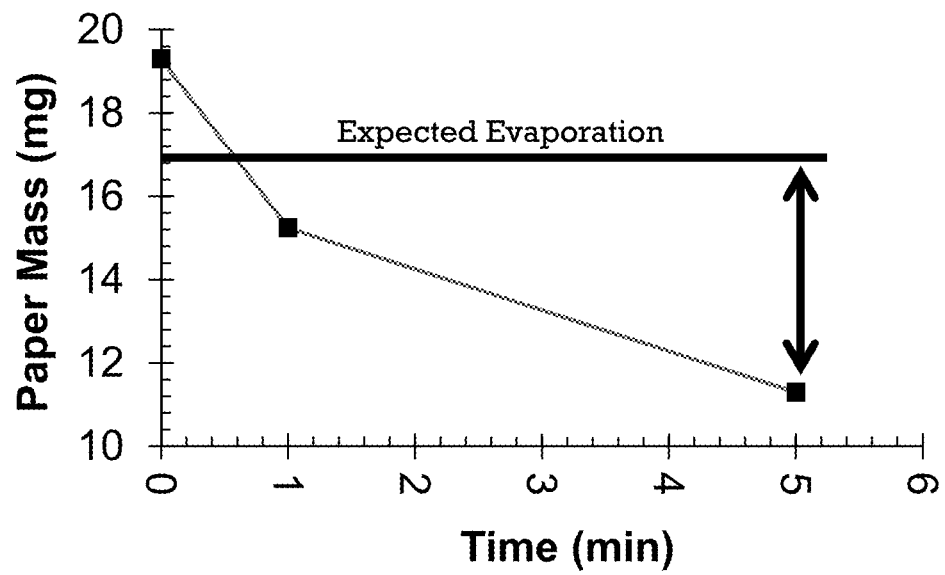
FIG. 24 Panel (a) illustrates the removal of moisture from a paper pulp by a TRHC; and Panel (b) illustrates the vapor sorption rate from a paper pulp by a TRHC, according to some aspects of the present disclosure.
Figure 24:
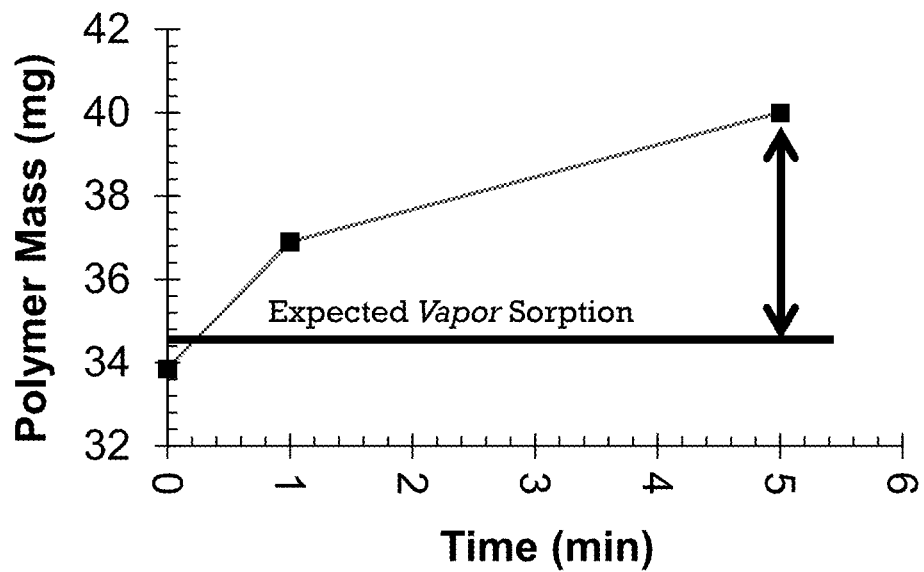

FIG. 24 Panel (a) illustrates the removal of moisture from a paper pulp by a TRHC; and Panel (b) illustrates the vapor sorption rate from a paper pulp by a TRHC, according to some aspects of the present disclosure. The removal of moisture from a paper pulp may be done using system as shown in FIG. 7. Panel (a) shows the expected evaporation (i.e., the paper mass resulting from natural evaporation) compared to the actual moisture loss (by the difference in mass of the paper pulp) using the TRHC. Using the TRHC and the system in FIG. 7, the mass of the paper pulp may be reduced, indicating a large amount of moisture being removed from the paper pulp. Panel (b) shows the expected vapor sorption (i.e., the natural weight of the TRHC with little to know moisture being absorbed) compared to the increase in polymer mass as a result from the absorption of moisture from the paper pulp.

EXAMPLES

Example 1. A composition of a thermo-responsive desiccant, the composition comprising: thermo-responsive polymer; and a hygroscopic agent; wherein: the thermo-responsive desiccant has a lower critical solution temperature (LCST) transition, the thermo-responsive desiccant is configured to adsorb a water at a temperature below the LCST transition, and the thermo-responsive desiccant is configured to desorb the water at a temperature above the LCST transition.

Example 2. The composition of Example 1, wherein: a main chain comprising the thermo-responsive polymer is covalently bonded to a plurality of side chains comprised of the hygroscopic agent forming a grafted polymer.

Example 3 The composition of Example 1, wherein: the thermo-responsive polymer is interlaced with the hygroscopic agent forming an interpenetrating network, and the hygroscopic agent is not covalently bonded to the hygroscopic agent.

Example 4. The composition of Example 1, wherein: the thermo-responsive polymer is covalently bonded to the hygroscopic agent, resulting in a copolymer.

Example 5. The composition of Example 1, wherein the thermo-responsive polymer comprises at least one of poly (N-isopropylacrylamide) (PNIPAAm), poly[2-dimethylamino]ethyl methacrylate, hydroxypropylcellulose, poly(vinylcaprolactame), poly-2-isopropyl-2-oxazoline, or polyvinyl methyl ether.

Example 6. The composition of Example 1, wherein the hygroscopic agent comprises an inorganic salt.

Example 7. The composition of Example 6, wherein the inorganic salt comprises at least one of calcium chloride ($CaCl_2$)), lithium chloride (LiCl), aluminum chloride (AlCl$_3$), sodium chloride (NaCl), sodium nitrate (NaNO$_3$), sodium hydroxide (NaOH), potassium nitrate (KNO$_3$), potassium chloride (KCl), potassium carbonate (K$_2$CO$_3$), potassium sulfate (K$_2$SO$_4$), a potassium phosphate, potassium hydroxide (KOH), magnesium chloride (MgCl$_2$), magnesium nitrate (Mg(NO$_3$)$_2$), magnesium sulfate (MgSO$_4$), magnesium iodide (MgI$_2$), calcium chloride (CaCl$_2$)), calcium nitrate (Ca(NO$_3$)$_2$), zinc chloride (ZnCl$_2$), zinc nitrate (ZnNO$_3$), zinc sulfate (ZnSO$_4$), iron chloride (FeCl$_3$), lithium bromide (LiBr), or lithium chloride (LiCl).

Example 8. The composition of Example 1, wherein the hygroscopic agent comprises an organic polyelectrolyte.

Example 9. The composition of Example 8, wherein the organic polyelectrolyte comprises at least one of sodium acrylate, poly(sodium 4-styrenesulfonate), chlorine-doped polypyrrole (PPy-Cl), a sodium polyacrylate, poly(ethylene oxide), an alginate, or a cross-linked bipolar polymer.

Example 10. The composition of Example 1, further comprising a crosslinker.

Example 11. The composition of Example 10, wherein the crosslinker comprises at least one of N,N'-methylenebisacrylamide (MBAA), N,N'-ethylenebisacrylamide, N,N'-propylenebisacrylamide, polyethylene glycol diacrylate, divinylbenzene (para, ortho, meta), bis(2-methacryloyl)oxyethyl disulfide, 1,4-Bis(4-vinylphenoxy)butane, or triethylene glycol dimethacrylate.

Example 12. The composition of Example 1, wherein the LCST transition is between about –10° C. and about 150° C.

Example 13. The composition of Example 1, wherein the LCST transition may be adjusted by adding additional thermo-responsive polymer to the thermo-responsive desiccant.

Example 14. The composition of Example 1, wherein the LCST transition by be adjusted by adding additional hygroscopic agent to the thermo-responsive desiccant.

Example 15. The composition of Example 1, wherein: the thermo-responsive desiccant has an adsorption capacity between about 1.5 g moisture/g composition and about 4 g moisture/g composition when at a temperature below the LCST transition.

Example 16. The composition of Example 15, wherein: the thermo-responsive desiccant has a performance retention of at least 95% of the adsorption capacity after at least 100 cycles of alternating the temperature of the thermo-responsive desiccant above and below the LCST transition.

Example 17. The composition of Example 1, wherein: the thermo-responsive desiccant has an adsorption rate between greater than 0 g moisture/g composition-hour and about 3 g moisture/g composition-hour when at a temperature below the LCST transition.

Example 18. The composition of Example 1, wherein: the thermo-responsive desiccant has a desorption rate between greater than 0 g moisture/g composition-hour and about 3 g moisture/g composition-hour when at a temperature above the LCST transition.

Example 19. A device configured to remove a water from an air stream, the device comprising: a thermo-responsive desiccant; and a container comprising the thermo-responsive desiccant; wherein: the thermo-responsive desiccant comprises: thermo-responsive polymer; and a hygroscopic agent; wherein: the thermo-responsive desiccant has a lower critical solution temperature (LCST) transition, the thermo-responsive desiccant is configured to adsorb a water from the air stream at a temperature below the LCST transition, and the thermo-responsive desiccant is configured to desorb the water at a temperature above the LCST transition, the container is configured to rotate through a first zone and a second zone, while in the first zone, the thermo-responsive desiccant is configured to adsorb at least a portion of the water contained in the air stream at a temperature below the LCST transition, while in the second zone, the thermo-responsive desiccant is configured to desorb the water at a temperature above the LCST transition, and the water is desorbed in a vapor phase.

Example 20. The device of Example 19, wherein: the container is configured to receive a heat in the second zone.

Example 21. The device of Example 20, wherein: the heat is at least one of a condenser heat or a building waste heat.

Example 22. A device configured to remove a water from a substantially continuous sheet, the device comprising: a thermo-responsive desiccant; and a drum comprising the thermo-responsive desiccant; wherein: the thermo-responsive desiccant comprises: thermo-responsive polymer; and a hygroscopic agent; wherein: the thermo-responsive desiccant has a lower critical solution temperature (LCST) transition, the thermo-responsive desiccant is configured to adsorb a water at a temperature below the LCST transition, and the thermo-responsive desiccant is configured to desorb the water at a temperature above the LCST transition, the drum is configured to rotate and direct the substantially continuous sheet through a first zone and a second zone, while in the first zone, the thermo-responsive desiccant is configured to adsorb at least a portion of the water contained in the substantially continuous sheet at a temperature below the LCST transition, while in the second zone, the thermo-responsive desiccant is configured to desorb the water at a temperature above the LCST transition, and the water is desorbed in a liquid phase.

Example 23. The device of Example 22, wherein the substantially continuous sheet is a paper pulp.

Example 24. A device configured to remove a water from a granular material, the device comprising: a thermo-responsive desiccant; a first drum comprising the thermo-responsive desiccant; a second drum comprising the thermo-responsive desiccant; wherein: the thermo-responsive desiccant comprises: thermo-responsive polymer; and a hygroscopic agent; wherein: the thermo-responsive desiccant has a lower critical solution temperature (LCST) transition, the thermo-responsive desiccant is configured to adsorb a water at a temperature below the LCST transition, and the thermo-responsive desiccant is configured to desorb the water at a temperature above the LCST transition, the first drum and the second drum are positioned adjacent to each other to form a gap between the first drum and the second drum, the first drum rotates in a clockwise direction and the second drum rotates in a counterclockwise direction, the gap is configured to receive the granular material, each drum is configured to be operated at a temperature below the LCST transition while at least in the gap, such that at least a portion of the water adsorbed by the thermo-responsive desiccant and removed from the granular material, each drum is configured to rotate to the second zone operated at a temperature above the LCST transition, such that the water is desorbed from the thermo-responsive desiccant, and the water is desorbed in the liquid phase.

Example 25. The device of Example 24, wherein: the granular material comprises a food product.

Example 26. A device configured to remove a water from an air stream, the device comprising: a thermo-responsive desiccant; and a matrix material comprising the thermo-responsive desiccant; wherein: the thermo-responsive desiccant comprises: thermo-responsive polymer; and a hygroscopic agent; wherein: the thermo-responsive desiccant has a lower critical solution temperature (LCST) transition, the thermo-responsive desiccant is configured to adsorb a water at a temperature below the LCST transition, and the thermo-responsive desiccant is configured to desorb the water at a temperature above the LCST transition, the matrix material comprises a metal foam having a pore volume, at least a portion of the pore volume is filled with the thermo-responsive desiccant, the matrix material is configured to contact the air stream, and the water is desorbed in the liquid phase.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A composition of a thermo-responsive desiccant, the composition comprising:
   a thermo-responsive polymer comprising N-isopropylacrylamide (NIPAAm);
   a hygroscopic agent comprising sodium acrylate (SA); and
   a crosslinker comprising N,N'-methylenebisacrylamide (MBAA); wherein:
   the thermo-responsive desiccant has a lower critical solution temperature (LCST) transition,
   the thermo-responsive desiccant is configured to adsorb a water at a temperature below the LCST transition,
   the thermo-responsive desiccant is configured to desorb the water at a temperature above the LC ST transition, and
   the LCST transition is approximately 50° C.

2. The composition of claim 1, wherein:
   a main chain comprising the thermo-responsive polymer is covalently bonded to a plurality of side chains comprised of the hygroscopic agent forming a grafted polymer.

3. The composition of claim 1, wherein:
   the thermo-responsive polymer is interlaced with the hygroscopic agent forming an interpenetrating network, and
   the hygroscopic agent is not covalently bonded to the hygroscopic agent.

4. The composition of claim 1, wherein:
   the thermo-responsive polymer is covalently bonded to the hygroscopic agent, resulting in a copolymer.

5. The composition of claim 1, wherein the thermo-responsive polymer further comprises at least one of poly[2-dimethylamino]ethyl methacrylate, hydroxypropylcellulose, poly(vinylcaprolactame), poly-2-isopropyl-2-oxazoline, or polyvinyl methyl ether.

6. The composition of claim 1, wherein the hygroscopic agent further comprises an inorganic salt.

7. The composition of claim 6, wherein the inorganic salt comprises at least one of calcium chloride ($CaCl_2$), lithium chloride (LiCl), aluminum chloride ($AlCl_3$), sodium chloride (NaCl), sodium nitrate ($NaNO_3$), sodium hydroxide (NaOH), potassium nitrate ($KNO_3$), potassium chloride (KCl), potassium carbonate ($K_2CO_3$), potassium sulfate ($K_2SO_4$), a potassium phosphate, potassium hydroxide (KOH), magnesium chloride ($MgCl_2$), magnesium nitrate ($Mg(NO_3)_2$), magnesium sulfate ($MgSO_4$), magnesium iodide ($MgI_2$), calcium chloride ($CaCl_2$), calcium nitrate ($Ca(NO_3)_2$), zinc chloride ($ZnCl_2$), zinc nitrate ($ZnNO_3$), zinc sulfate ($ZnSO_4$), iron chloride ($FeCl_3$), lithium bromide (LiBr), or lithium chloride (LiCl).

8. The composition of claim 1, wherein the hygroscopic agent further comprises at least one of poly(sodium 4-styrenesulfonate), chlorine-doped polypyrrole (PPy-Cl), a sodium polyacrylate, poly(ethylene oxide), an alginate, or a cross-linked bipolar polymer.

9. The composition of claim 1, wherein the crosslinker further comprises at least one of N,N'-ethylenebisacrylamide, N,N'-propylenebisacrylamide, polyethylene glycol diacrylate, divinylbenzene (para, ortho, meta), bis(2-methacryloyl)oxyethyl disulfide, 1,4-Bis(4-vinylphenoxy)butane, or triethylene glycol dimethacrylate.

10. The composition of claim 1, wherein:
    the thermo-responsive desiccant has an adsorption capacity between about 1.5 g moisture/g composition and about 4 g moisture/g composition when at a temperature below the LCST transition.

11. The composition of claim 1, wherein:
    the thermo-responsive desiccant has an adsorption rate between greater than 0 g moisture/g composition-hour and about 3 g moisture/g composition-hour when at a temperature below the LCST transition.

12. The composition of claim 1, wherein:
    the thermo-responsive desiccant has a desorption rate between greater than 0 g moisture/g composition-hour and about 3 g moisture/g composition-hour when at a temperature above the LCST transition.

13. A device configured to remove a water from a substantially continuous sheet, the device comprising:
    a thermo-responsive desiccant; and
    a drum comprising the thermo-responsive desiccant; wherein:
    the thermo-responsive desiccant comprises:
       a thermo-responsive polymer comprising N-isopropylacrylamide (NIPAAm);
       a hygroscopic agent comprising sodium acrylate (SA); and
       a crosslinker comprising N,N'-methylenebisacrylamide (MBAA); wherein:
       the thermo-responsive desiccant has a lower critical solution temperature (LCST) transition,
       the thermo-responsive desiccant is configured to adsorb a water at a temperature below the LCST transition,
       the thermo-responsive desiccant is configured to desorb the water at a temperature above the LCST transition,
    the LCST transition is approximately 50° C.,
    the drum is configured to rotate and direct the substantially continuous sheet through a first zone and a second zone, while in the first zone, the thermo-responsive desiccant is configured to adsorb at least a portion of the water contained in the substantially continuous sheet at a temperature below the LCST transition, while in the second zone, the thermo-responsive desiccant is configured to desorb the water at a temperature above the LC ST transition, and the water is desorbed in a liquid phase.

14. The device of claim 13, wherein the substantially continuous sheet is a paper pulp.

15. A device configured to remove a water from a granular material, the device comprising:
- a thermo-responsive desiccant;
- a first drum comprising the thermo-responsive desiccant;
- a second drum comprising the thermo-responsive desiccant; wherein:
- the thermo-responsive desiccant comprises:
  - a thermo-responsive polymer comprising N-isopropylacrylamide (NIPAAm);
  - a hygroscopic agent comprising sodium acrylate (SA); and
  - a crosslinker comprising N,N'-methylenebisacrylamide (MBAA); wherein:
  - the thermo-responsive desiccant has a lower critical solution temperature (LCST) transition,
  - the thermo-responsive desiccant is configured to adsorb a water at a temperature below the LCST transition,
  - the thermo-responsive desiccant is configured to desorb the water at a temperature above the LCST transition,
  - the LCST transition is approximately 50° C.,
  - the first drum and the second drum are positioned adjacent to each other to form a gap between the first drum and the second drum,
  - the first drum rotates in a clockwise direction and the second drum rotates in a counterclockwise direction,
  - the gap is configured to receive the granular material,
  - each drum is configured to be operated at a temperature below the LCST while at least in the gap, such that at least a portion of the water adsorbed by the thermo-responsive desiccant and removed from the granular material,
  - each drum is configured to rotate and direct the substantially continuous sheet through a first zone and a second zone,
  - while in the first zone, the thermo-responsive desiccant is configured to adsorb at least a portion of the water contained in the substantially continuous sheet at a temperature below the LCST,
  - while in the second zone, the thermo-responsive desiccant is configured to desorb the water at a temperature above the LCST,
  - each drum is configured to rotate to the second zone operated at a temperature above the LCST, such that the water is desorbed from the thermo-responsive desiccant, and
  - the water is desorbed in the liquid phase.

16. The device of claim 15, wherein:
the granular material comprises a food product.

* * * * *